United States Patent
Hotta et al.

(10) Patent No.: US 7,952,808 B2
(45) Date of Patent: May 31, 2011

(54) DISPLAY SYSTEM FOR VEHICLE AND DISPLAY METHOD

(75) Inventors: Aira Hotta, Kanagawa-ken (JP); Takashi Sasaki, Kanagawa-ken (JP); Haruhiko Okumura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 177 days.

(21) Appl. No.: 12/412,904

(22) Filed: Mar. 27, 2009

(65) Prior Publication Data
US 2010/0073773 A1  Mar. 25, 2010

(30) Foreign Application Priority Data
Sep. 25, 2008 (JP) .................. 2008-245362

(51) Int. Cl.
*G02B 27/14* (2006.01)
*G09G 5/00* (2006.01)
*G03B 21/00* (2006.01)

(52) U.S. Cl. .................. 359/630; 359/633; 340/425.5; 340/438; 340/980; 345/7; 353/13

(58) Field of Classification Search .......... 359/630–633; 340/425.5, 435–438, 905, 932.2, 961, 980, 340/990, 995; 345/7, 8, 32; 353/13, 81; 348/46, 115, 143; 715/764, 771
See application file for complete search history.

(56) References Cited

U.S. PATENT DOCUMENTS

| 5,793,310 | A  | * | 8/1998  | Watanabe et al. | ........ 340/995.14 |
| 6,011,494 | A  | * | 1/2000  | Watanabe et al. | ........ 340/995.14 |
| 6,348,877 | B1 | * | 2/2002  | Berstis et al.  | ................. 340/980 |
| 6,731,436 | B2 | * | 5/2004  | Ishii et al.    | ..................... 359/630 |
| 7,145,519 | B2 | * | 12/2006 | Takahashi et al.| ................. 345/7 |

FOREIGN PATENT DOCUMENTS

| JP | 07-228172    | 8/1995  |
| JP | 2006-017626  | 1/2006  |
| JP | 2006-284458  | 10/2006 |

\* cited by examiner

Primary Examiner — Loha Ben
(74) Attorney, Agent, or Firm — Turocy & Watson, LLP

(57) ABSTRACT

A display system for vehicle includes an outside information-obtaining section configured to obtain outside information of a moving object; a position-detecting section configured to detect a position of one eye of an image viewer getting on the moving object; and an image-projecting section. The image-projecting section is configured to obtain a position of a target in the outside information obtained by the outside information-obtaining section, to generate a display object on the basis of the obtained position of the target, and to project a light flux including an image having the generated display object toward the one eye of the image viewer on the basis of the detected position of the one eye.

20 Claims, 15 Drawing Sheets

DISPLAY SYSTEM FOR VEHICLE AND DISPLAY METHOD

CROSS-REFERENCE TO RELATED APPLICATIONS

This application is based upon and claims the benefit of priority from the prior Japanese Patent Application No. 2008-245362, filed on Sep. 25, 2008; the entire contents of which are incorporated herein by reference.

BACKGROUND OF THE INVENTION

This invention relates to a display system for vehicle and a display method.

BACKGROUND ART

As a display apparatus for vehicle, Head-Up Display (HUD) by which driving information such as speed of a vehicle or a navigation information for destination are projected on a windshield to making the outside information and the vehicle information visible at the same time.

HUD can intuitively exhibit the display for a viewer, and for example, a method for dynamically modifying a display aspect of an arrow in respond to the outside (JP-A 2006-284458) and a method for changing size of the iconography along a lapse of time with movement of a moving object (JP-A 2006-17626) and so forth have been proposed.

In the case of a normal HUD, the display of the HUD is observed with both eyes. The depth position in many existing HUD displays is displayed at the front of 2-3 meters from the driver, which is optically designed. Therefore, when the driver attempts to observe the HUD display image with watching a far outside at the same time in driving, binocular parallax is caused and the display becomes very difficult to be viewed, because the depth positions of HUD display image and the outside image position are different.

Furthermore, because the display image of HUD is reflected at a windshield to be observed, the parallax (double image) due to the thickness of the reflection screen of the windshield is caused, and thereby the display becomes difficult to be viewed.

For solving such a problem, a single-eye HUD for observing the display image with one eye has been proposed. That is, there is a technique in which the binocular parallax is cancelled and the display image is presented only to one eye for the purpose of displaying the depth position of the display object (such as an arrow representing the traveling direction) to be farther than the optical display position. In addition, there is a proposed technique presenting the display image only to one eye for the purpose of preventing the above-described double image (JP-A 7-228172).

In the case of presenting the display image for the purpose of displaying the depth position of the display object to be farther than the optical display position, the projected image is observed with one eye, and therefore, the binocular parallax disappears, and therefore, the problem due to the difference between the depth positions of the HUD display image and the outside image is solved.

On the other hand, in the single-eye HUD, the depth cue based on the binocular parallax disappears, and therefore, the depth position of the display object becomes unclear for the image viewer. Therefore, the driver cannot accurately specify the depth position, and the driver comes not to find the depth position of the display object, and as a result, the display becomes difficult to be viewed.

SUMMARY OF THE INVENTION

According to an aspect of the invention, there is provided a display system for vehicle, including: an outside information-obtaining section configured to obtain outside information of a moving object; a position-detecting section configured to detect a position of one eye of an image viewer getting on the moving object; and an image-projecting section configured to obtain a position of a target in the outside information obtained by the outside information-obtaining section, to generate a display object on the basis of the position of the target, and to project a light flux including an image having the generated display object toward the one eye of the image viewer on the basis of the position of the one eye.

According to another aspect of the invention, there is provided a display method including: obtaining a position of a target in outside information of a moving object; generating a display object on the basis of the obtained position of the target; generating a light flux including an image having the generated display object; detecting a position of one eye of an image viewer getting on the moving object; and projecting the light flux toward the one eye of the image viewer on the basis of the position of the one eye.

DETAILED DESCRIPTION OF THE INVENTION

Hereinafter, embodiments of the invention will be described with reference to drawings.

In the specification and each of the drawings, the same signs are appended to the same components as described above with respect to a previously presented figure, and the detailed explanation thereof will be appropriately omitted.

First Embodiment

Figure 1:
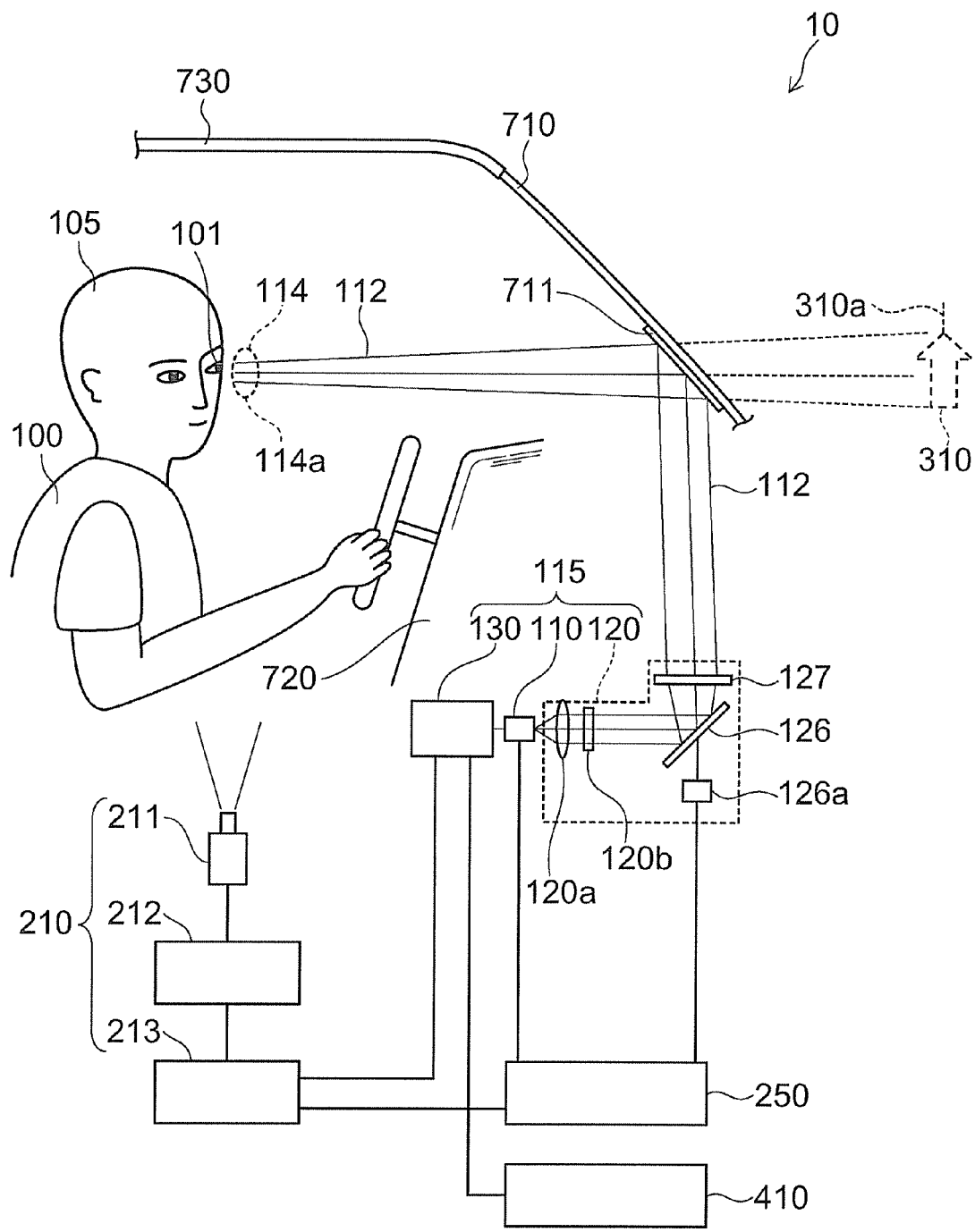
FIG. 1 is a schematic view illustrating the configuration of an display system for vehicle according to a first embodiment of the invention.

FIG. 1 is a schematic view illustrating the configuration of an display system for vehicle according to a first embodiment of the invention.

As shown in FIG. 1, the display system 10 according to the first embodiment includes an outside information-obtaining section 410, a position-detecting section 210, and an image-projecting section 115.

The outside information-obtaining section 410 obtains outside information of a moving object 730.

The position-detecting section 210 detects the position of one eye 101 of an image viewer 100 getting on the moving object 730.

The image-projecting section 115 obtains a position of a target in the outside information obtained by the outside information-obtaining section 410, and generates a display object on the basis of the obtained position of the target, and projects a light flux 112 including an image having the generated display object toward one eye 101 of the image viewer 100 on the basis of the detected position of one eye 101.

The moving object 730 is a vehicle such as automobile, and the image viewer 100 is a driver (steering person) driving the automobile.

The outside information is information about a road or the like outside the moving object 730 and is information about shape of road or traffic intersection, names of places, building or landmark object.

The target (displayed object) is a content of various information that the display system 10 informs image viewer 100, such as circumstance of the road for driving of the moving object 730, names of places, landmark object in traveling, various guidance such as course, speed, attention and warning. And, in the display system 10, for displaying these targets in appropriate positions in the outside information, the positions in the outside information of the targets are required.

The display object is provided in the image that the display system 10 presents to the image viewer 100 corresponding to the targets, and is a display content such as an arrow representing travelling direction, speed, attention, or warming, with regard to the driving information of the moving object 730 on which the display system 10 is mounted.

Specific examples of derivation of the position in the outside information of the target and disposition of the display object in the image will be described later.

As illustrated in FIG. 1, the display system 10 is provided, for example, in the moving object 730 such as vehicle, namely in the back of a dash board 720 of the moving object 730 as viewed from the image viewer 100 that is a driver.

The image-projecting section 115 has, for example, an image data-generating section 130, an image-forming section 110, and a projection section 120.

The image data-generating section 130 generates data for the image including the display object, on the basis of the outside information obtained in the outside information-obtaining section 410 and the position of the detected one eye 101 of the image viewer 100. That is, for example, on the basis of a pathway in which the moving object 730 is presumed to travel, the image data-generating section 130 generates image signal including image data including the display object such as an arrow corresponding to the pathway in which the moving object 730 is presumed to travel.

And, the image signal including the image data generated in the image data-generating section 130 is supplied to the image-forming section 110.

As the image-forming section 110, various optical switches such as LCD or DMD or MEMS can be used. And, the image-forming section 110 forms an image in the screen of the image-forming section 110 on the basis of image signal including image data having display object supplied from the image data-generating section 130.

For the image-forming section 110, a laser projector or LED projector or the like can also be used, and in this case, the image is formed by a laser beam.

Hereinafter, the image-forming section 110 using LCD having LED used for the light source will be explained. By using LED as the source, the apparatus can be downsized and save power.

The projection section 120 projects the image formed in the image-forming section 110 to one eye 101 of the image viewer 100.

The projection section 120 is illustratively based on a projection lens, a mirror, and various optical devices for controlling divergence angle (diffusion angle). Moreover, in some cases, the projection section 120 includes a light source.

In this specific example, an imaging lens 120a, a lenticular lens 120b, a mirror 126, and an aspheric Fresnel lens 127 are used.

The light flux 112 outgoing from the image-forming section 110 passes through the imaging lens 120a, the lenticular lens 120b, the mirror 126, the aspheric Fresnel lens 127, and is reflected by a reflecting body 711 (semi-transparent reflecting body) provided on, for example, a windshield 710 (window shield, transparent plate) of the moving object 730 on which the display system 10 is mounted, and is projected to one eye 101 of the image viewer 100. And, the image viewer perceives a virtual image 310 formed in a position of a virtual image-formed position 310a, through the reflecting body 711. As described above, the display system 10 can be used as HUD. The above windshield 710 is a transparent plate compartmenting a space into a space housing the image viewer 100 of the moving object 730 and a space outside the moving object 730. Moreover, the reflecting body 711 can be included in and regarded as the windshield 710.

As described above, the divergence angle is controlled and the light flux 112 reaches the image viewer 100, and the image viewer 100 observes the image with one eye 101. In this case, because the average distance between both eyes of the image viewer 100 is 6 cm, when the width of the light flux 112 in the head 105 of the image viewer 100 is controlled to be about 6 cm, the image is not projected to both eyes. It is preferable that the image is projected to the dominant eye of the image viewer 100 from the ease of the image.

In the above description, as the means for controlling the divergence angle of the light flux 112, the lenticular lens 120b is used. A diffusion plate or the like having diffusion angle controlled can be used.

Angle the mirror 126 can be adjusted by a driving section 126a. The mirror 126 can be based on, as well as flat mirror, a concave mirror being a reflection surface having power, and also in this case, its angle can be changed by the driving section 126a. In the displayed image, strain depending on the angle or the like of the mirror is occasionally generated, but performing strain compensation in the image data-generating section 130 can present the image without strain to the image viewer 100.

For the image-projecting section 115, as well as the above specific example, various modifications are possible as described later.

On the other hand, the position-detecting section 210 detects one eye 101 to which the image of the image viewer 100 is projected. The position-detecting section 210 can include, for example, an image-taking section 211 configured to take the image of the image viewer 100, an image-processing section 212 configured to process the taken image taken by the image-taking section 211, and a calculation section 213 configured to evaluate and detect the position of one eye 101 of the image viewer 100 on the basis of the data processed by the image-processing section 211.

In the calculation section 213, for example, by using a technique for person authentication described in JP 3279913 and so forth, the face of the image viewer 100 is recognized and positions of eyeballs as face parts of the image viewer 100 are calculated and the position of one eye 101 to which the image of the image viewer 100 is projected is evaluated and detected.

The image-taking section 211 is disposed, for example, in front of or laterally to the driver seat of the moving object 730, and, for example, takes an image of the face of the image viewer 100 that is the driver, and detects one eye 101 of the image viewer as described above.

Moreover, in this specific example, a control section 250 is further provided. The control section adjusts at least any one of a projection range 114a and a projection position 114 of the light flux 112 by controlling the image-projecting section 115 on the basis of the position of one eye 101 of the image viewer 100 detected in the position-detecting section 210.

For example in this specific example, the control section 250 controls the driving section 126a connected to the mirror 126 composing part of the projection section 120 to control the angle of the mirror 126, and thereby, to control the projection position 114.

Moreover, the control section 250 controls, for example, various optical parts composing the projection section 120 to enable the projection range 114a to be controlled.

Thereby, when the head 105 of the image viewer 100 moves, following the movement can control the position in which the image is presented, and displacement from the image-presented position due to the movement of the head 105 of the image viewer 100 disappears, and the practical view range can be enlarged.

The control section may control, for example, the image-forming section 110 to adjust brightness or contrast or the like of the image.

In the above specific example, by the control section 250, at least any one of the projection range 114a and the projection position 114 of the light flux 112 is automatically adjusted based on the detected position of the one eye 101, but the invention is not limited thereto. For example, based on the detected position of the one eye 101, at least any one of the projection range 114a and the projection position 114 of the light flux 112 may be manually adjusted. In this case, while viewing the image of the head 105 of the image viewer 100 taken by the projection section 120 through some display, the driving section 126a can be manually controlled to control the angle of the mirror 126.

As described above, the display system 10 according to this embodiment is a display system for single eye view. And, by providing the outside information-obtaining section 410 and the position-detecting section 210, the position in the outside information of the target can be obtained, and the display object can be generated based on the position of the obtained target and the detected position of the one eye, and therefore, the display object can be disposed on an optional depth position as described later. This can provide the display system which displays the display object at an optional depth position and performs display that is easily viewable for the driver.

When the position of one eye 101 is not substantially changed, the display object may be generated on the basis of the obtained position in the outside information of the target. Thereby, the display object can also be disposed at an optional depth position. This can provide the display system which displays the display object at an optional depth position and performs display that is easily viewable for the driver.

Figure 2:
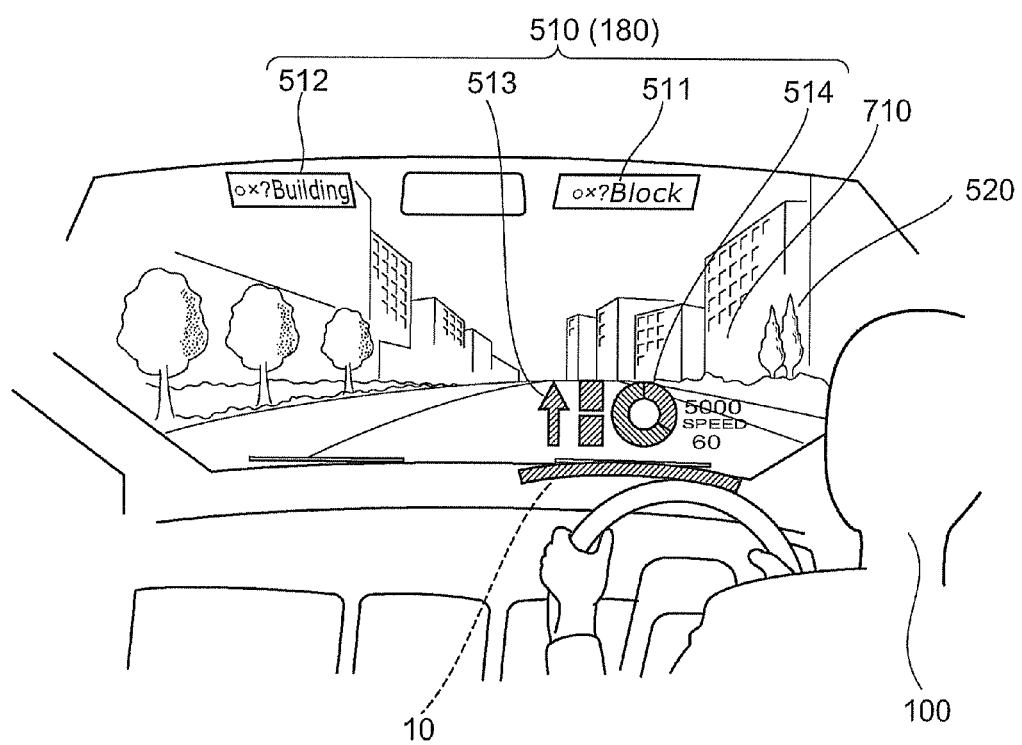
FIG. 2 is a schematic view illustrating a usage condition of the display system according to the first embodiment.

FIG. 2 is a schematic view illustrating a usage condition of the display system according to the first embodiment.

As shown in FIG. 2, in the display system 10 according to this embodiment, a current position 511, surrounding building information or the like 512, a display arrow 513 for the course, and a display image 510 (display object 180) such as vehicle information 514 such as speed or fuel are projected and displayed on a reflecting body 711 (not shown) of the windshield 710, and thereby, the driver (image viewer) 100 views an outside image 520 and the display image 510 simultaneously. As described above, the display system 10 is used as HUD for vehicle. Hereinafter, the case where the display object 180 is the display arrow 513 will be taken as an example.

One characteristic of HUD allows the display to be overlapped on the background (outside image 520), and hence, the guidance arrow (such as the display arrow 513) can be displayed, or risk place can be marked on the road. Thus, it is advantageous that the driver (image viewer 100) can intuitively understand the display. In particular, in the single eye HUD, even when the gaze point of the driver is far, HUD display can also be viewed simultaneously, and hence, the single eye HUD is suitable for the display overlapped on the outside.

On the other hand, in the single eye HUD, depth cue by the binocular parallax is cancelled, and hence, the depth position of the display object 180 becomes unclear for the image viewer 100, thus, the depth position of the display object 180 is difficult to be specified.

Accordingly, inventors have investigated an effective depth cue that can be used in the single eye view.

Figure 3A:
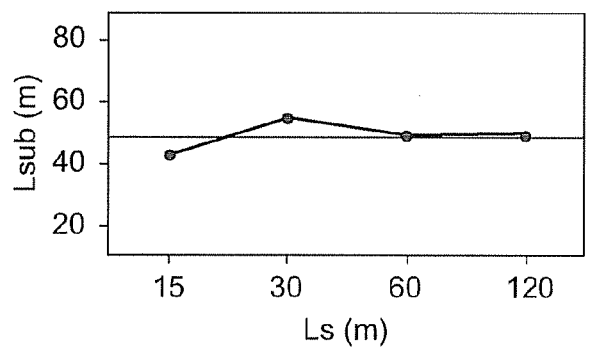
FIGS. 3A to 3C are graphic views illustrating characteristics of the display system according to the first embodiment.
Figure 3B:
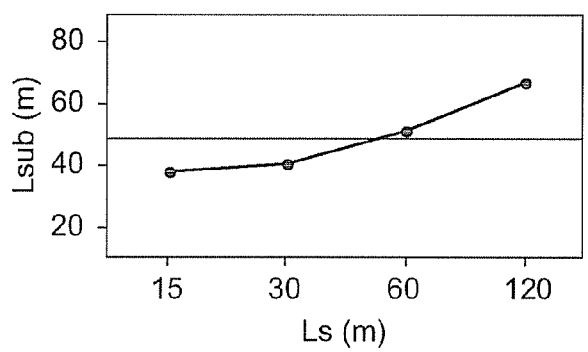
Figure 3C:
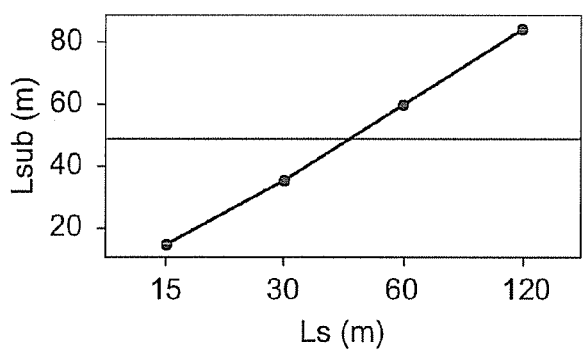

FIGS. 3A to 3C are graphic views illustrating characteristics of the display system according to the first embodiment.

That is, FIGS. 3A to 3C illustrate the results that in the single eye view, the depth position is subjectively evaluated so that "movement parallax", "size", and "position" presumed to relate to the sense of depth serve as parameters. That is, the experimental results are illustrated about the subjective depth distance Lsub perceived by the image viewer 100 when the set depth distance Ls (distance from the image viewer 100 to the set depth position) is varied by changing "movement parallax", "size", and "position". In these views the horizontal axis represents the set depth distance Ls, and the vertical axis represents the distance Lsub. And, FIG. 3A corresponds to "movement parallax", FIG. 3B corresponds to "size", and FIG. 3C corresponds to "position".

"Movement parallax" is an effect that the shape (including angle or the like) of the display changes along with movement of the position of head 105 (one eye 101) of the image viewer 100 by the depth position. And, "size" is an effect that the size of the display changes by the variation of the depth position. "position" is the effect that the position of the display (position in the vertical direction or the horizontal direction as viewed from the image viewer) changes by the variation of the depth position.

As shown in FIG. 3A, even when the set depth distance Ls is varied on the basis of "movement parallax", the subjective depth distance Lsub is not almost varied.

As shown in FIG. 3B, when the set depth distance Ls is varied on the basis of "size", the subjective depth distance Lsub varies but the variation is small.

By contrast, as shown in FIG. 3C, when the set depth distance Ls is varied on the basis of "position", the subjective depth distance Lsub largely varies, and the set depth distance Ls is approximately proportional to the subjective depth distance Lsub.

From this result, in single eye HUD, it can be understood that the relative positional relation between the position of the display object 180 and the position of the background affects the sense of depth the most largely. Therefore, it has been found that the display object of the single eye HUD can be controlled to be at an optional depth position by controlling to be in the position in accordance with the background.

Hereinafter, the control of "position" in the display image corresponding to the variation of the set depth distance Ls will be described.

Figure 4A:
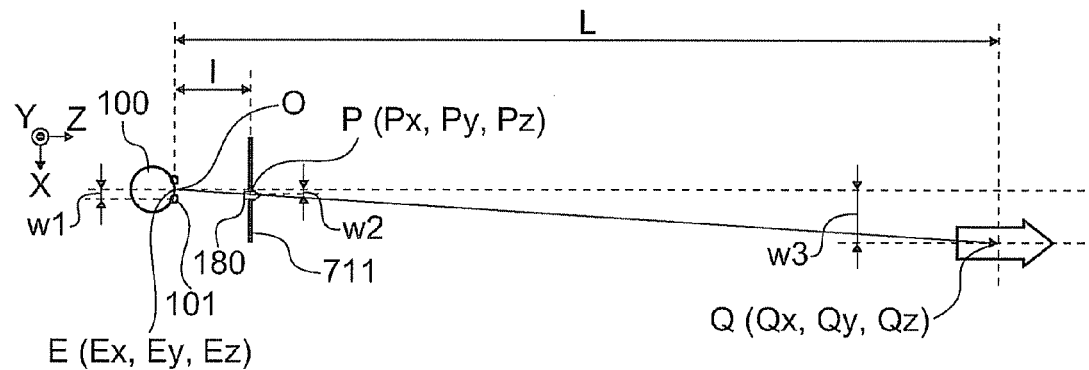
FIGS. 4A and 4B are schematic views illustrating a coordinate system in the display system according to the first embodiment.
Figure 4B:
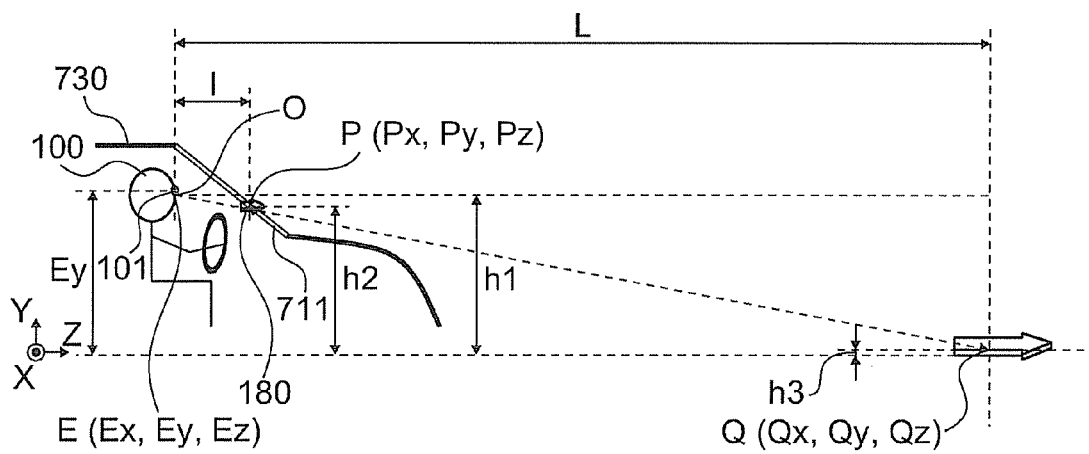

FIGS. 4A and 4B are schematic views illustrating a coordinate system in the display system according to the first embodiment.

That is, FIG. 4A is a schematic view viewed from above the head of the image viewer 100, and the FIG. 4B is a schematic view viewed from the lateral direction of the image viewer 100.

Here, as shown in FIGS. 4A and 4B, by way of example, a three-dimensional orthogonal coordinate system is used. The vertical direction with respect to the ground is set to be Y axis, and the traveling direction of the moving object 730 is set to be Z axis, and the axis perpendicular to Y axis and Z axis is set to be X axis. When viewed from the image viewer 100, the upper direction of the image viewer 100 is Y axis direction and the traveling direction is Z axis direction and the lateral direction is X axis direction.

Here, the position of one eye (such as dominant eye, for example, right eye) 101 with which the image viewer views is set to be one-eye position E (Ex, Ey, Ez).

And, the position at which the display object 180 formed by the display system 10 according to this embodiment is reflected by the reflecting body 711 of the moving object 730 is set to be display object position P (Px, Py, Pz). The display object position P can be set to be the position serving as the reference of the display object 180, and for example, can be set to be the shape center or the gravity center of the display object 180.

Here, a prescribed reference position O (0, h1, 0) is determined. Here, the original point of the coordinate axes is set to be the point in contact with the ground, (0, 0, 0). That is, the reference position O is a position whose height from the original point of the coordinate axes is h1.

And, when viewed from the above prescribed reference position O, the position at which the virtual image of the display object 180 is optically formed is set to be virtual image position Q (Qx, Qy, Qz).

Viewed from the reference position O, the shift amount in the X axis direction of one-eye position E is w1, and the shift amount in X axis direction of the display object position P is w2, and the shift amount in the X axis direction of the virtual image position Q is w3.

On the other hand, viewed from the original point of the coordinate axes, the shift amount in the Y axis direction of one-eye position E is Ey, and viewed from the reference position O, the shift amount in the Y axis direction of the display object position P is (h1-h2), and the shift amount in the Y axis direction of the virtual image position Q is (h1-h3).

Moreover, the distance in the Z axis direction between the reference position O and the display object position P is set to be the display object distance I, and the distance in the Z axis direction between the reference position O and the virtual image position Q is set to be the virtual image distance L. The virtual image distance L corresponds to the set depth distance Ls.

In disposing the display object 180, the virtual image position Q becomes the depth target position, and the position of the set depth distance Ls becomes the depth target position, viewed from the reference position O.

Here, variation in the Z axis direction of the one-eye position E (Ex, Ey, Ez) and the display object position P (Px, Py, Pz) is substantially small, and hence, the description thereof is omitted, and the one-eye position E (Ex, Ey) and the display object position P (Px, Py) will be described. That is, a method for disposing the display object position P (Px, Py) in the X-Y plane will be described.

Figure 5A:
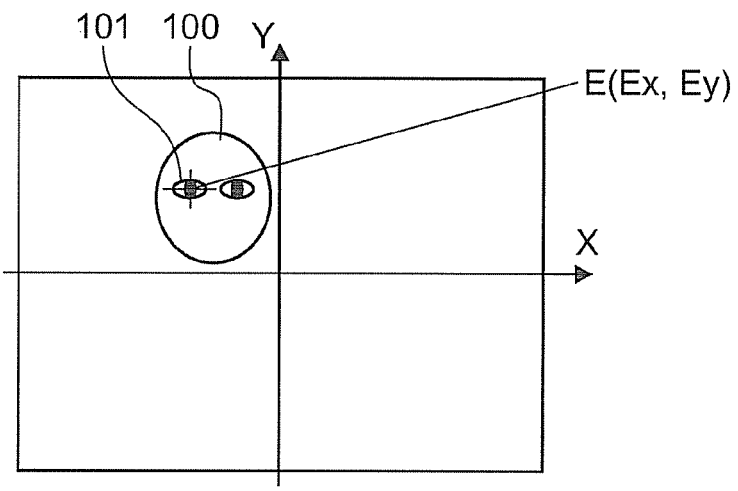
FIGS. 5A to 5C are schematic views illustrating coordinates in the display system according to the first embodiment.
Figure 5B:
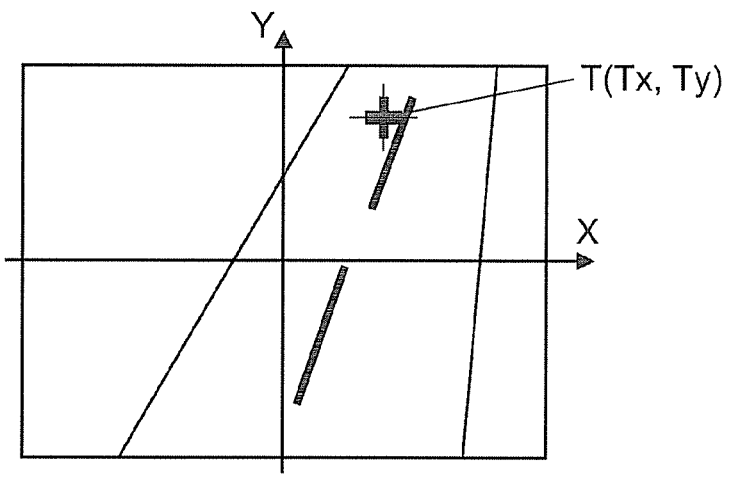
Figure 5C:
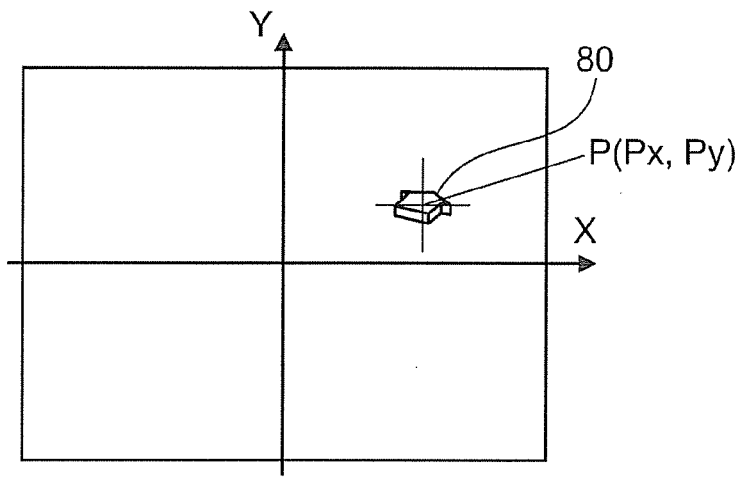

FIGS. 5A to 5C are schematic views illustrating coordinates in the display system according to the first embodiment.

That is, FIGS. 5A, 5B, and 5C illustrate the above one-eye position E (Ex, Ey), the outside display position T (Tx, Ty) to be described later, and the display object position P (Px, Py), respectively.

FIG. 5A illustrates the taken image of the head 105 of the image viewer 100 taken by the image-taking section 211, the taken image is processed in the image-processing section 212, and the position of one eye 101 of the image viewer 100 is determined and detected by the calculation section 213. As described above, one-eye position E (Ex, Ey) that is the position of the one eye 101 in the case where viewed from the reference position O is detected by the position-detecting section 210. That is, Ex and Ey are calculated by the position-detecting section 210.

FIG. 5B illustrates the outside information obtained in the outside information-obtaining section 410. The outside information-obtaining section 410 obtains the outside information such as shape of road or traffic intersection, for example, by reading data for the preliminarily stored, for example, road circumstance or by taken data or the like of the outside taken from the moving object 730. In this specific example, width or shape of the road, distance from the moving object 730 (image viewer 100) in the respective positions of the roads, or undulation of the road is obtained as the outside information.

And, the position in the outside information of the target is obtained. That is, for example, based on the pathway in which the moving object 730 is presumed to travel, the position in the outside information of the target such as the arrow corresponding to the pathway in which the moving object 730 is presumed to travel is obtained as the outside display position T (Tx, Ty). That is, Tx and Ty are obtained. This operation is performed by, for example, the image data-generating 130.

FIG. 5C illustrates the display object position P (Px, Py) that is the position of the display object 180 projected to the reflecting body 711 of the moving object 730 by the display system 10. The display object position P (Px, Py) is determined based on the above one-eye position E (Ex, Ey) and the outside position T (Tx, Ty). The operation is performed by, for example, the image data-generating section 130.

That is, in the display system 10 according to this embodiment, based on the outside display position T (Tx, Ty) on the basis of the outside information and the detected position of one eye, namely, one-eye position E (Ex, Ey), the image having the display object 180 disposed in the display object position P (Px, Py) is generated, and the light flux 112 including the image is projected to one eye 101 of the image viewer 100. Thereby, the display system can be provided, having the display object 180 displayed at an optional depth position and providing display easily viewable for the driver.

In the above description, the outer display position T (Tx, Ty) can be set to accord with the virtual image position Q (Qx, Qy). However, as described later, the outer display position T (Tx Ty) and the virtual image position Q (Qx, Qy) can be set to be different. Hereinafter, first, for the case where the outside display position T (Tx, Ty) and the virtual image position Q (Qx, Qy) are set to accord, the method for setting the display object position P (Px, Py) will be described.

As illustrated in FIG. 4A, for the X axis direction, the ratio of the shift amount w3 in the X axis direction of the outside display position T (Tx, Ty), namely, the virtual position Q (Qx, Qy) and the shift amount W2 in the X axis direction of the display object position P (Px, Py) is the same as the ratio of the virtual image distance L and the display object distance I. Therefore, when one eye 101 of the image viewer 100 is disposed at the reference position O, the value in the X axis direction of the display object position P (Px, Py), namely, the shift amount W2 is obtained by W3×I/L. If one eye 101 of the image viewer 100 is displaced from the reference position O, it is sufficient that the compensation is performed by the displacement amount thereof, namely, the distance Ex (W1).

On the other hand, as illustrated in FIG. 4B, for the Y axis direction, the ratio of the shift amount (h1-h3) in the Y axis direction of the outside display position T (Tx, Ty), namely, virtual image position Q (Qx, Qy) and the shift amount (h1-h2) in the Y axis direction of the display object position P (Px, Py) is the same as the ratio of the virtual image direction L and the display object distance I. Therefore, when one eye 101 of the image viewer 100 is disposed at the reference position O, the value in the Y axis direction of the display object position P (Px, Py), namely, the shift amount (h1-h2) is obtained by (h1-h3)×I/L. If one eye 101 of the image viewer 100 is displaced from the reference position O, it is sufficient that the compensation is performed by the displacement amount thereof, namely, the distance (h1-Ey).

In this case, based on the disposition of the display object 180, as well as the display object position P (Px, Py), at least any one of the gradient (α, β, χ) and the size S of the display object 180 may be changed.

As described above, at the optional outside display position T (Tx, Ty), namely, the virtual image position Q (Qx, Qy), the display object 180 can be displayed.

In this case, it is important at which position the outside display position T (Tx, Ty), namely, the virtual image position Q (Qx, Qy) is disposed in the Y axis direction of the outside information. That is, for example, when the outside information is a road or a traffic intersection, setting the outside display position T (Tx, Ty) at the position above the ground corresponding to the road or the traffic intersection or setting the outer display position T (Tx, Ty) at, for example, the position of a certain height from the ground significantly influences the subjective depth position (subjective depth distance Lsub) obtained by the image viewer 100.

Figure 6:
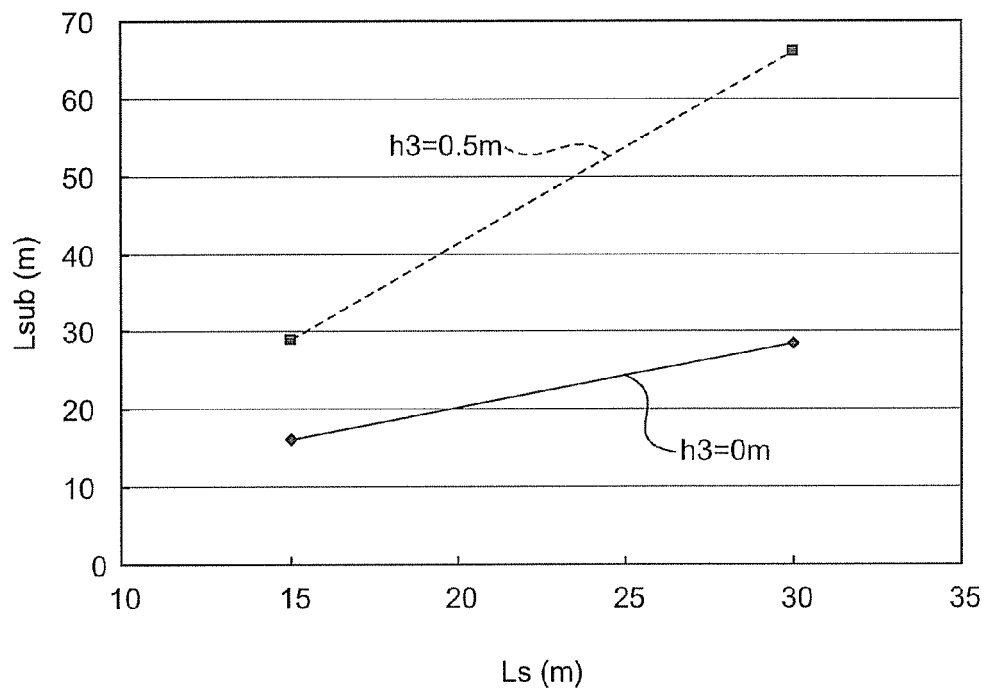
FIG. 6 is a graphic view illustrating characteristics of the display system according to the first embodiment.

FIG. 6 is a graphic view illustrating characteristics of the display system according to the first embodiment.

That is, FIG. 6 illustrates the experimental result investigating of the relation between the set depth distance Ls and the subjective depth distance Lsub in the case where the distance (distance h3) of the outside display position T (Tx, Ty), namely, the virtual image position Q (Qx, Qy) from the ground is set to be 0 m and 0.5 m in displaying the display object 180 in the display system 10. The horizontal axis represents the set depth distance Ls, and the vertical axis represents the subjective depth distance Lsub. Moreover, in this experiment, the set depth distance Ls is set to be two kinds of 15 m and 30 m. In FIG. 6, the solid line corresponds to the case where h3 is 0 m and the dashed line corresponds to the case where h3 is 0.5 m.

In this experiment, in response to variation of the set depth distance Ls and the distance h3, the position in the image of the display object 180, namely, the display object position P (Px, Py) is varied.

As shown in FIG. 6, in displaying the display object 180, when the distance h3 from the ground is 0 m, the set depth distance Ls accords with the subjective depth distance Lsub well. That is, when the display object 180 is disposed at the height according with the ground, the set depth distance Ls accords with the subjective depth distance Lsub well.

By contrast, in displaying the display object 180, when the distance h3 from the ground is 0.5 m, the subjective depth distance Lsub becomes larger than the set depth distance Ls. That is, it has been found that when the display object 180 is disposed above separately from the ground, the perception is farther than the depth of the set display object 180.

Therefore, in the display system 10 according to this embodiment, it is desirable that the display object 180 is disposed at the position in the image corresponding to the position in contact with the ground of the outside of the moving object 730. Thereby, the depth position of the display object 180 can be accurately perceived.

In the above description, the case where the outside display position T (Tx, Ty) is set to accord with the virtual image position Q (Qx, Qy) has been described, but hereinafter, the case where the outside display position T (Tx, Ty) and the virtual image position Q (Qx, Qy) are set to be different will be described. First, hereinafter, the experimental result will be described, in which the case that it is occasionally better to set the outside display position T (Tx, Ty) being different from the virtual image position Q (Qx, Qy) has been found.

Figure 7:
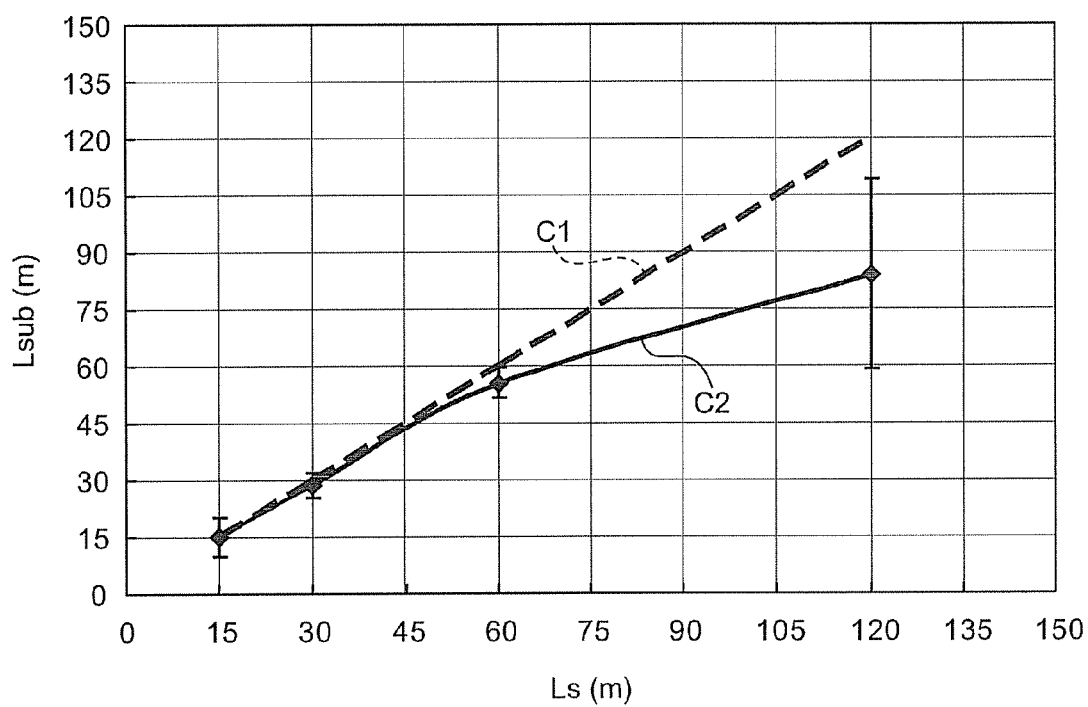
FIG. 7 is a graphic view illustrating characteristics of the display system according to the first embodiment.

FIG. 7 is a graphic view illustrating characteristics of the display system according to the first embodiment.

That is, FIG. 7 illustrates the experimental result of investigating the subjective depth distance Lsub perceived by a viewer when the display object 180 is displayed with varying the set depth distance Ls in the display system 10 according to this embodiment. The horizontal axis represents the set depth distance Ls, and the vertical axis represents the subjective depth distance Lsub. And, the dashed line C1 represents a characteristic of the case where the subjective depth distance Lsub accords with the set depth distance Ls, and the solid line C2 represents a characteristic of the subjective depth distance Lsub observed actually.

In this experiment, the distance (distance h3) from the ground is set to be 0 m, and the position in the image of the display object 180, namely, the display object position P (Px, Py) is changed according to the set depth distance Ls.

As shown in FIG. 7, when the set depth distance Ls is short, the solid line C2 almost accords with the dashed line C1 and the subjective depth distance Lsub accords with the set depth distance Ls. However, when the set depth distance Ls becomes longer, the solid line C2 transitions to be a smaller value than the dashed line C1.

Specifically, when the set depth distance Ls is 15 m and 30 m, the subjective depth distance Lsub accords with the set depth distance Ls, but when 60 m and 120 m, the subjective depth distance Lsub becomes shorter than the set depth distance Ls. And, the difference between the subjective depth distance Lsub and the set depth distance Ls is larger as the set depth distance Ls is longer.

When the solid line C2 (characteristic of the subjective depth distance Lsub) is approximated by a quadratic curve, the solid line C2 is represented by the following formula (1).

$$Ls=0.0037\times(Lsub)^2+1.14\times(Lsub) \qquad (1)$$

Therefore, based on the formula (1), the phenomenon of FIG. 7 can be that when the set depth distance Ls is less than 45 m, the subjective depth distance Lsub accords with the set depth distance Ls, but when 45 m or more, the subjective depth distance Lsub is shorter than the set depth distance Ls.

This phenomenon is the characteristic found for the first time in the experiment of this time, and the disposition of the display object 180 in the invention can be performed based on this phenomenon. That is, in the range of the set depth distance Ls in which the subjective depth distance Lsub does not accord with the set depth distance Ls, the difference is compensated in the display.

That is, in the display system 10 according to this embodiment, when the set depth distance Ls (depth target position) is smaller than 60 m, the depth target position at which the display object 180 is disposed is made to accord with the depth position of the position in the outside information of the target.

And, when the set depth distance Ls (depth target position) is 60 m or more, the depth target position at which the display object 180 is disposed is disposed so as to be farther than the depth position of the position in the outside information of the target when viewed from the image viewer 100.

Thereby, in the set depth distance Ls, namely, the optional depth target position, for a viewer, the subjective depth position can be perceived in the position according with the depth target position.

In this case, on the basis of the characteristic of the formula (1), by compensating the set depth distance Ls (namely, target depth position) so that the subjective depth distance Lsub accords to the set depth distance Ls, the display object 180 is displayed. For example, when the subjective depth distance Lsub is intended to be 90 m, according to the formula (1), the set depth position Ls (namely, target depth position) is compensated to be 133 m and the display object 180 is displayed.

Moreover, in the display system 10 according to this embodiment, when the set depth distance Ls (depth target position) is smaller than 45 m, the depth target position at which the display object 180 is disposed is made to accord with the depth position of the position in the outside information of the target. And, when the set depth distance Ls (depth target position) is 45 m or larger, the depth target position at which the display object 180 is disposed is disposed so as to be farther than the depth position of the position in the outside information of the target when viewed from the image viewer 100.

Thereby, the set depth distance Ls, namely, the optional depth target position, for a viewer, the subjective depth position can be perceived in the position according with the depth target position.

And, in the same manner, for example, on the basis of the characteristic of the formula (1), the compensation is performed.

As described above, in the image data-generating section 130, when the distance between the position in the outside information of the target and the moving object 730 is shorter than the preliminarily set distance, the depth target position at which the display object 180 is disposed is made to accord with the depth position of the position of the target in the outside information.

For example, on the basis of the pathway in which the moving object 730 is presumed to travel, the depth target position at which the display object 180 is disposed is calculated, and when the distance between the depth target position and the moving object 730 is shorter than the preliminarily set distance, the depth position of the outside information corresponding to the display object 180 to be displayed is made to accord with the depth target position in the image, and the display object 180 is disposed at the depth target position.

And, when the distance between the position in the outside information of the target and the moving object 730 is the preliminarily set distance or larger, the depth target position at which the display object 180 is disposed is disposed to be farther than the depth position of the position of the target in the outside information when viewed from the image viewer 100.

For example, when the distance between the depth target position and the moving object 730 is the preliminarily set distance or larger, in the image, the depth target position is compensated so as to be farther than the depth position of the outside information corresponding to the display object 180 to be displayed, and the display object 180 is disposed at the compensated depth target position.

In this case, the depth target position is compensated so that the subjective depth distance Lsub intended to be perceived and the set depth position Ls (namely, depth target position) satisfy the formula (1), and the display object 180 is disposed.

Moreover, in the image data-generating section 130, when the distance between the position of the target in the outside information and the moving object 730 is shorter than the preliminarily set distance, the position at which the display object 180 is disposed in the image is made to accord with the position to which the position in the outside information of the target corresponds in the image.

For example, on the basis of the pathway in which the moving object 730 is presumed to travel, the depth target position at which the display object 180 is disposed is calculated, and when the distance between the depth target position and the moving object 730 is shorter than the preliminarily set distance, the display object 180 is disposed at the position in the image corresponding to the depth target position.

And, when the distance between the position of the target in the outside information and the moving object 730 is the preliminarily set distance or larger, the position at which the display object 180 is disposed in the image is disposed at a position farther than a position in the image corresponding to the position in the outside information of the target from the center in the image.

That is, when the distance between the depth target position and the moving object 730 is the preliminarily set distance or larger, the disposition position of the display object 180 is compensated to be a position farther than a position in the image corresponding to the depth target position from the center of the image, and the display object 180 is disposed.

In the above description, disposition of the display object 180 corresponds to setting of the display object position P (Px, Py).

That is, the depth target position is compensated so that the subjective depth distance Lsub intended to be perceived and the set depth position Ls (namely, depth target position) satisfy, for example, the formula (1), and the display object position P (Px, Py) corresponding to the depth target position is set. In this case, with the compensation, the display object position P (Px, Py) becomes a position farther than the position before the compensation from the center in the image.

In the above description, the preliminarily set distance can be any one of 45 m and 60 m. That is, 45 m is the distance at which the subjective depth distance Lsub comes to be shorter than the set depth distance Ls, and when 45 m is adopted as the preliminarily set distance, the subjective depth distance Lsub can be made accurately accord with the set depth distance Ls. On the other hand, 60 m is the distance at which the subjective depth distance Lsub (including its variation) substantially comes to be shorter than the set depth distance Ls, and when 60 m is adopted as the preliminarily set distance, the subjective depth distance Lsub can be made accord with the set depth distance Ls substantially without problems.

And, when the distance between the position of the target in the outside information and the moving object 730, namely, the distance between the depth target position and the moving object 730 is the preliminarily set distance or larger, the compensation is performed on the basis of the characteristic of the formula (1), and the display object 180 is disposed. Thereby, the image viewer 100 can be made more accurately perceive the depth position of the display object 180 at a desired optional depth target position.

The above preliminarily set distance may be other than 45 m and 60 m. Depending on preference of the image viewer 100 or the specification of the moving object 730 on which the display system 10 is mounted, the above preliminarily set distance may be, for example, 50 m, for example, between 45 m and 60 m, and more than 60 m in some cases.

Moreover, before and after the preliminarily set distance, the above compensation treatment is not discontinuously performed, but the above compensation treatment may be continuously performed so that, for example, the formula (1) is satisfied. Moreover, the formula (1) has been expressed as a quadratic function, but may be expressed by another function. That is, it is sufficient that when the distance is longer than the preliminarily set distance, as the characteristic illustrated in FIG. 7 is compensated, the set depth distance Ls, namely, the depth target position only needs to be compensated so as to be adapted to the subjective depth distance Lsub, and the function used in the compensation treatment is optional.

Moreover, on the basis of the desired optional depth target position, at least any one of the display object position P (Px, Py, Pz), the gradient (α, β, χ) and the size S of the display object 180 may be changed.

One example of operation of the above display system 10 according to this embodiment will be described by using a flow chart.

Figure 8:
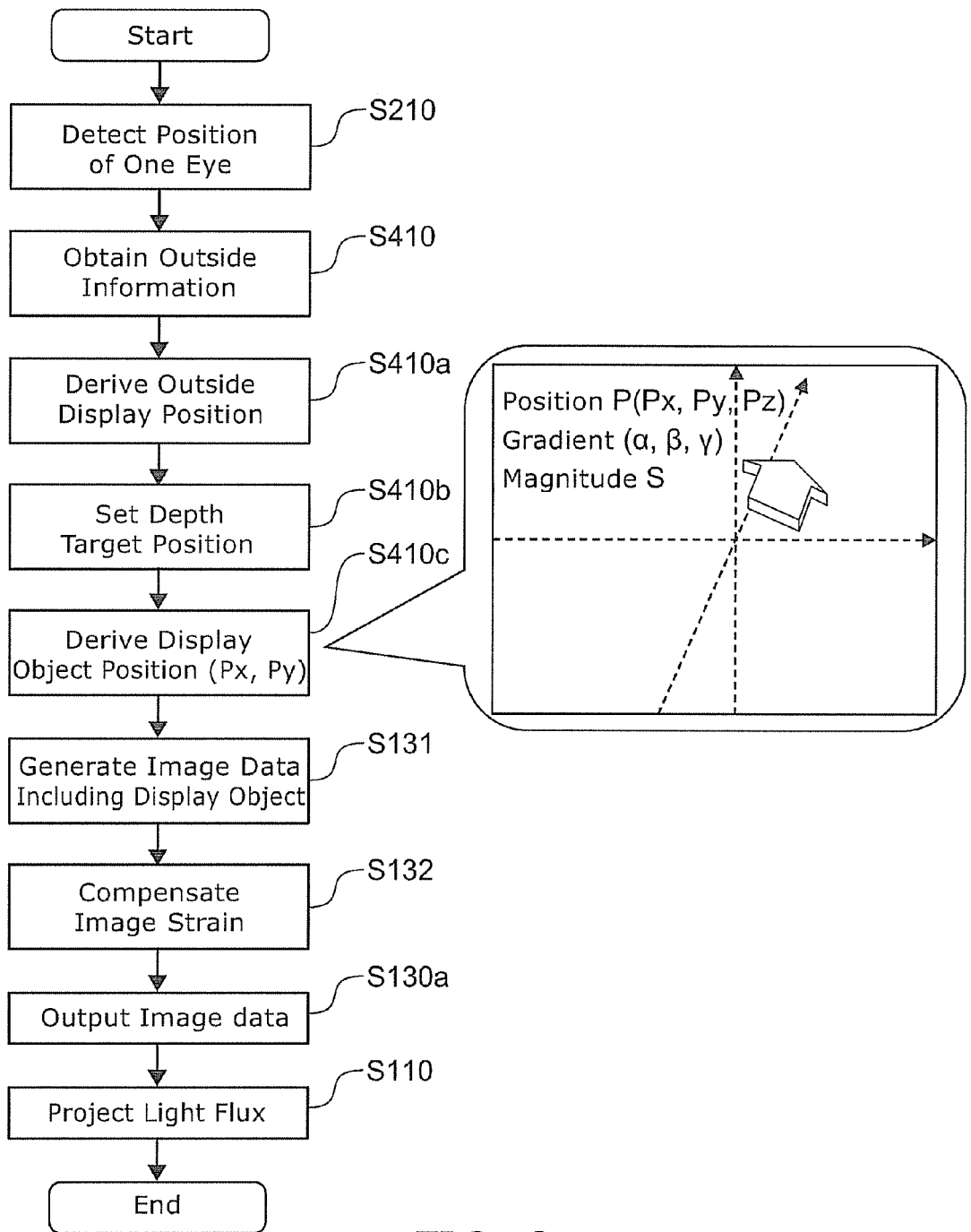
FIG. 8 is a flow chart illustrating the operation of the display system according to the first embodiment.

FIG. 8 is a flow chart illustrating the operation of the display system according to the first embodiment.

Figure 9:
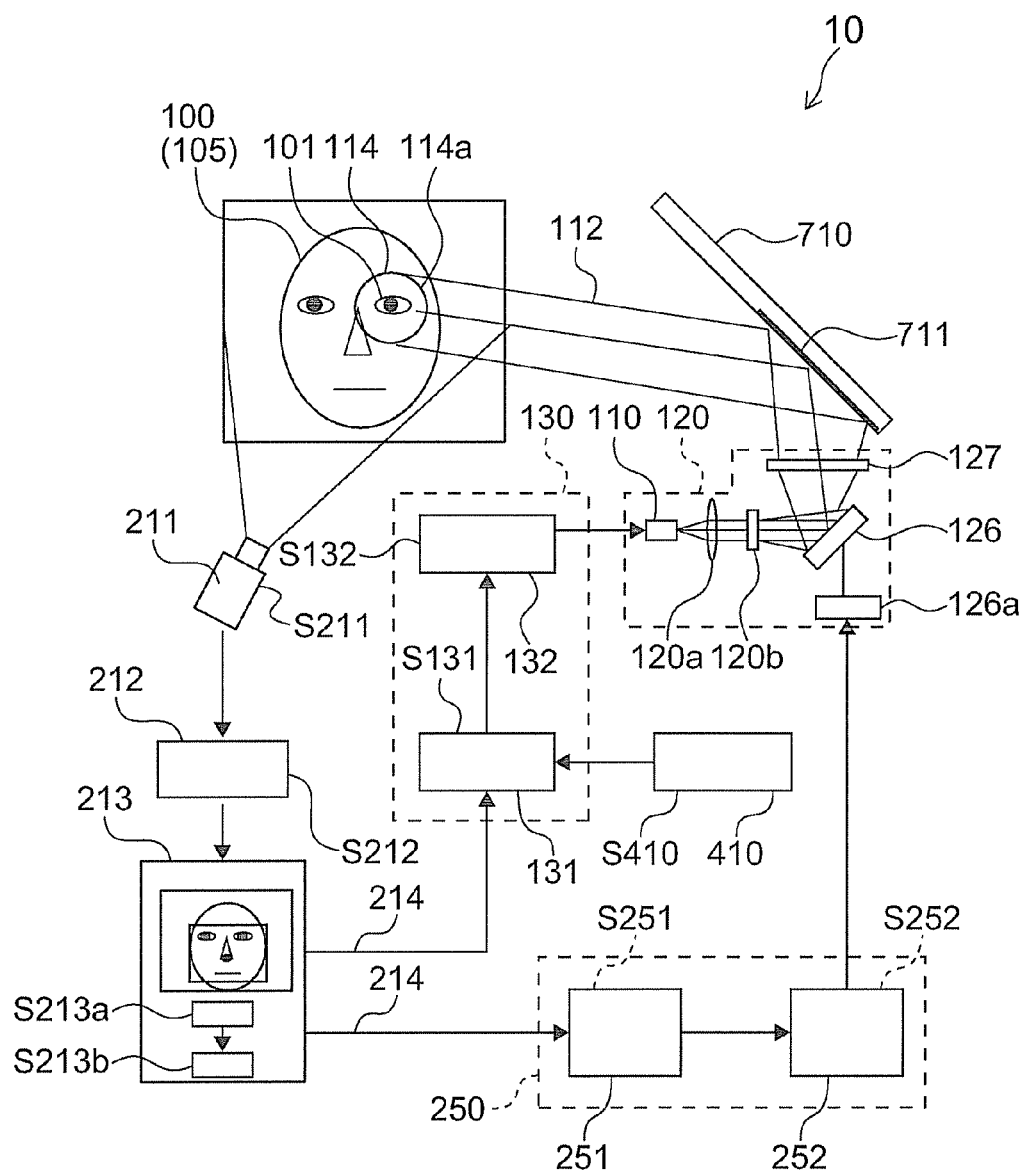
FIG. 9 is a schematic view illustrating the configuration and operation of the display system according to the first embodiment.

FIG. 9 is a schematic view illustrating the configuration and operation of the display system according to the first embodiment.

As shown in FIG. 8, first, the position of one eye 101 of the image viewer 100 is detected (Step S210).

That is, as shown in FIG. 9, the head 105 of the image viewer 100 is image-taken by the image-taking section 211 (Step S211). And, the taken image taken by the image-taking section 211 is image processed by the image-processing section 212 and processed so as to be easily used for the subsequent calculation (Step S212). And, on the basis of the data image processed in the image-processing section 212, the calculation section 213, first, extracts feature points of the face (Step S213a), and on the basis of them, the coordinate of the eyeball position is obtained (Step S213b). Thereby, the position of one eye 101 is detected, and the detected position data 214 of one eye 101 is supplied to the control section 250 and the image data-generating section 130.

Next, as shown in FIG. 8, by the outside information-obtaining section 410, the outside information is obtained (Step S410).

Next, the position in the outside information of the target, namely, the outside display position T (Tx, Ty) is obtained (Step S410a). For example, on the basis of the preliminarily set pathway and the outside information, the outside display position T (Tx, Ty) is derived.

And, on the basis of the outside display position T (Tx, Ty), the depth target position is set (Step S410b). In this case, using the characteristic in FIG. 7, the compensation can be performed on the basis of the set depth distance Ls.

On the basis of them, the display object position P (Px, Py, Pz) is derived (Step S410c). In this case, at least any one of the gradient (α, β, χ) and the size S of the display object 180 may be changed.

On the basis of the data, the image data including the display object 180 is generated (Step S131). The generation of the image data is performed by, for example, a generating section 131 of the image data-generating section 130 illustrated in FIG. 9.

Then, the generated image data are subjected to the processing of image strain compensation (Step 132). This process is performed by, for example, an image strain compensation processing section 132 illustrated in FIG. 9. In this case, on the basis of the position data 214 of one eye 101 of the image viewer 100, f the image strain compensation can be processed. Moreover, the image strain compensation can be processed by the reflecting body 711 provided on the windshield 710 or the characteristic of the image-projecting section 115.

And, the image data is output to the image-forming section 110 (Step S130a).

Then, in the image-forming section 110, on the basis of the image data, the light flux 112 including the image having the display object 180 is projected toward one eye 101 of the image viewer 100, and thereby, the image is displayed (Step S110).

In above description, the order of Steps S210, S410, S410a, S410b, S410c, S131, S132, S130a, and S110 can be replaced as long as technically feasible, and the Steps can be carried out simultaneously.

Moreover, as shown in FIG. 9, on the basis of the detected position data 214 of one eye 101, a control signal-generating section 251 of the control section 250 generates a motor control signal for controlling the motor of the driving section 126a (Step S251).

And, on the basis of the signal, a driving section circuit 252 generates the driving signal for controlling the motor of the driving section 126a (Step S252).

Thereby, the driving section 126a is controlled to control the mirror 126 to have a predetermined angle. Thereby, when the head 105 (one eye 101) of the image viewer 100 moves, the presentation position of the image come to be controllable by following the movement, and displacement from the image presentation position due to the movement of the head 105 of the image viewer 100 disappears, and the practical view range can be enlarged.

FIRST EXAMPLE

Hereinafter, examples of this embodiment will be described.

Figure 10:
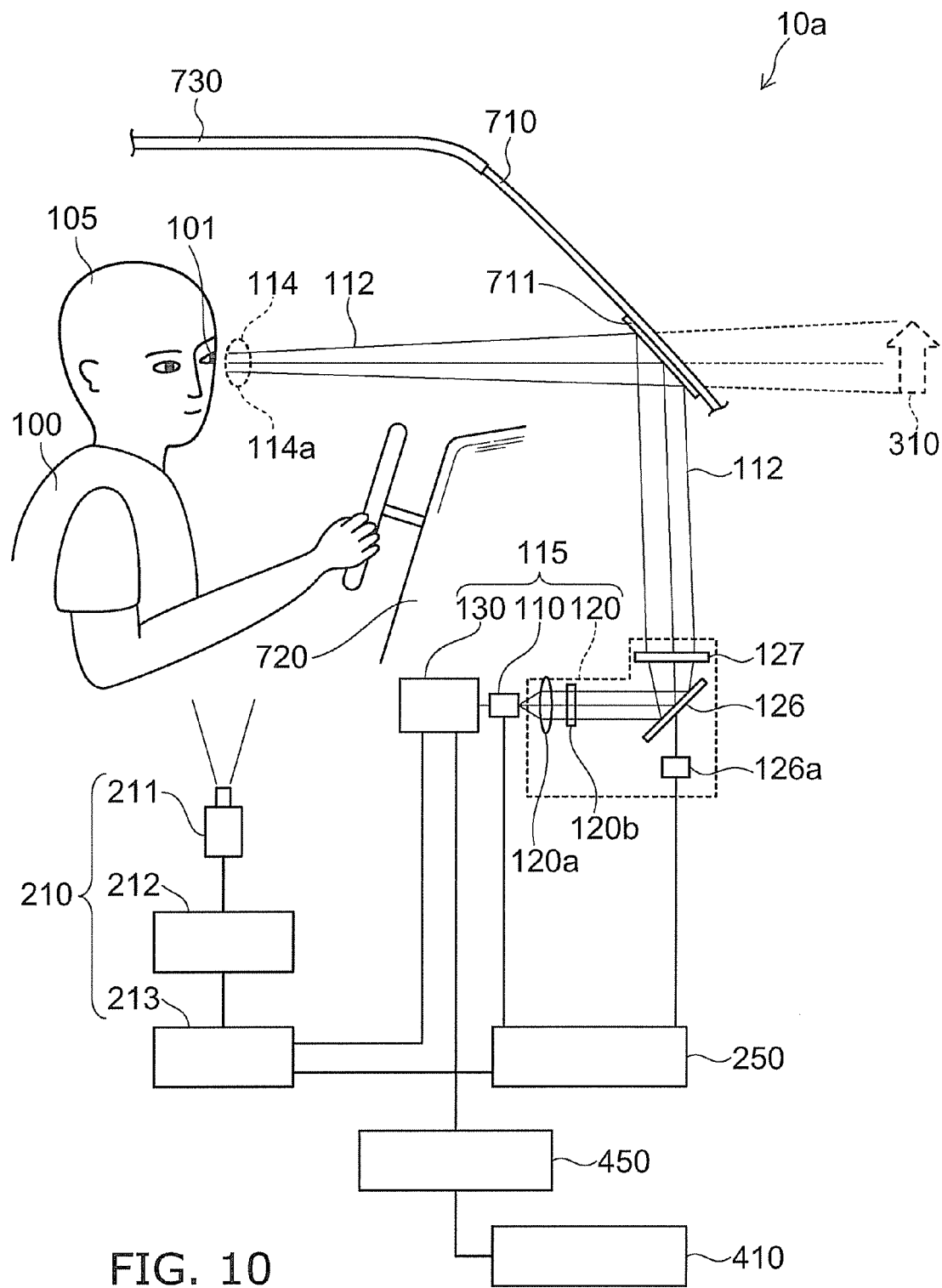
FIG. 10 is a schematic view illustrating the configuration of an display system according to a first example of the first embodiment.

FIG. 10 is a schematic view illustrating the configuration of an display system according to a first example of the embodiment.

As shown in FIG. 10, the display system 10a according to first example further includes a pathway-generating section 450 configured to generate a pathway in which the moving object 730 is presumed to travel. Other than the configuration, the display system 10a can be the same as the display system 10, and hence, the description thereof will be omitted.

The pathway-generating section 450 calculates the pathway in which the moving object 730 is presumed to travel, on the basis of the outside information obtained by the outside information-obtaining section 410 and, for example, the current position of the moving object. In this case, it is possible that candidates of some pathways are illustratively calculated, and the image viewer 100 that is the driver of the moving object 730 is prompted to perform the selection, and from the result, the pathway is determined.

Then, the image data-generating section 130 generates image data including the display object 180 on the basis of the pathway generated in the pathway-generating section 450.

It is noted that this pathway-generating section 450 can be housed, for example, in the image data-generating section 130. Moreover, the pathway-generating section 450 may be housed in various components (including the components to be described later) housed in the display system.

This pathway-generating section 450 is not necessarily provided in the display system 10a. For example, the section corresponding to the pathway-generating section 450 is provided in the navigator system provided separately in the moving object 730, and by obtaining the pathway which is generated in the navigator system and in which the moving object 730 is presumed to travel, the image data-generating section 130 may generate the image data including the display object 180.

Furthermore, the section corresponding to the pathway-generating section 450 may be provided separately from the moving object 730. In this case, for example, by obtaining the data from the section corresponding to the pathway-generating section 450 provided separately from the moving object 730 using a wireless technique, the image data-generating section 130 can generate the image data including the display object 180.

As described above, the pathway-generating section 450 (and the section corresponding thereto) may be provided inside or outside the image data-generating section 130, and may be provided inside or outside the display system 10a, and may be provided inside or outside the moving object 730. Hereinafter, the pathway-generating section 450 (and the section corresponding thereto) will be omitted and described.

SECOND EXAMPLE

Figure 11:
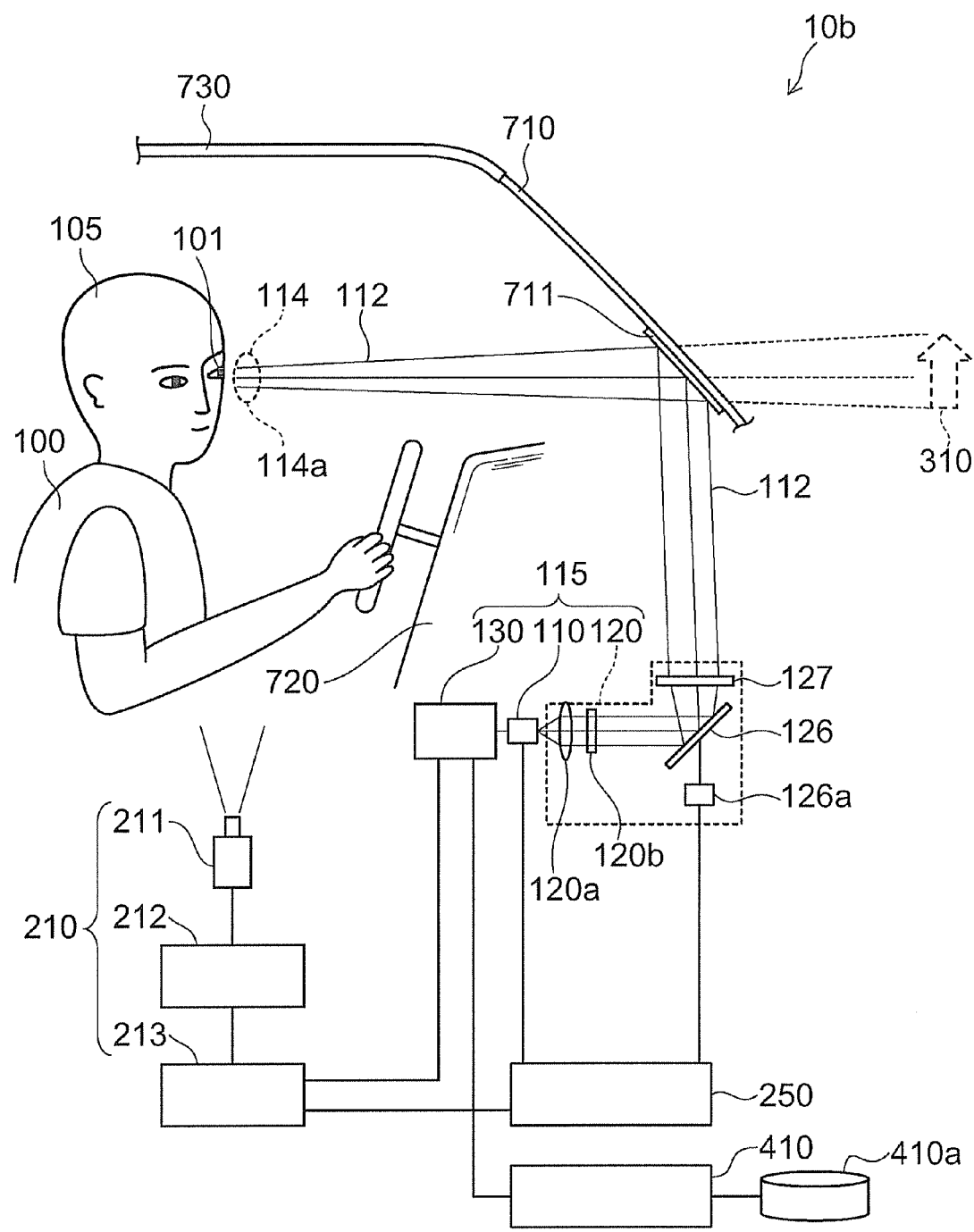
FIG. 11 is a schematic view illustrating the configuration of an display system according to a second example of the first embodiment.

FIG. 11 is a schematic view illustrating the configuration of an display system according to a second example of the embodiment.

As shown in FIG. 11, the display system 10b according to the second example has an outside information data-storing section 410a in which the outside information of the moving object 730 is preliminarily stored. Thereby, the outside information-obtaining section 410 obtains the data for the outside information that are preliminarily stored in the outside information data-storing section 410a.

The outside information data-storing section 410a can be based on magnetic recording and reproducing apparatuses such as HDD, recording apparatuses based on an optical technique such as CD or DVD, and various recording apparatuses using semiconductor can be used.

The outside information data-storing section 410a can store as the outside information of the moving object 730, various information about, shape of road or traffic intersection, names of places, building or landmark object outside the moving object 730. Thereby, on the basis of the current position of the moving object 730, the outside information-obtaining section 410 can read the outside information from the outside information data-storing section 410a and supply the outside information to the image data-generating section 130. And, as described above, for example, on the basis of the pathway in which the moving object 730 is presumed to travel, the outside display position T (Tx, Ty) is obtained, corresponding to the display object 180 such as an arrow corresponding to the pathway in which the moving object 730 is presumed to travel and using the outside display position enables the above operation to be used.

In reading the information stored in the outside information data-storing section 410a, the current position of the moving object 730 (image viewer 100) is grasped by GPS (Global Positioning System) or the like, and the traveling direction is grasped, and thereby, the outside information corresponding to the position and the traveling direction can be read. Such a system detecting GPS or the traveling direction may be housed in the display system 10b according to this example, or provided separately from the display system 10b, and thereby, the detection result of GPS or the system for detecting the traveling direction may be input to the display system 10b.

Moreover, the above outside information data-storing section 410a may be housed in the outside information-obtaining section 410.

It is noted that in the display system 10 according to the first embodiment, the outside information data-storing section 410a is not provided, and hereat, for example, a data-storing section corresponding to the outside information data-storing section 410a can be provided separately from the display system 10. In this case, the data of the data-storing section corresponding to the outside information data-storing section 410a provided outside is input to the display system 10, and thereby, the display system 10 can carry out the above operation.

Moreover, in the case where the outside information data-storing section 410a is not provided in the display system 10, such a section for detecting the outside information as described as follows is provided, and thereby, the same function as that of the outside information data-storing section 410a can also be provided.

THIRD EXAMPLE

Figure 12:
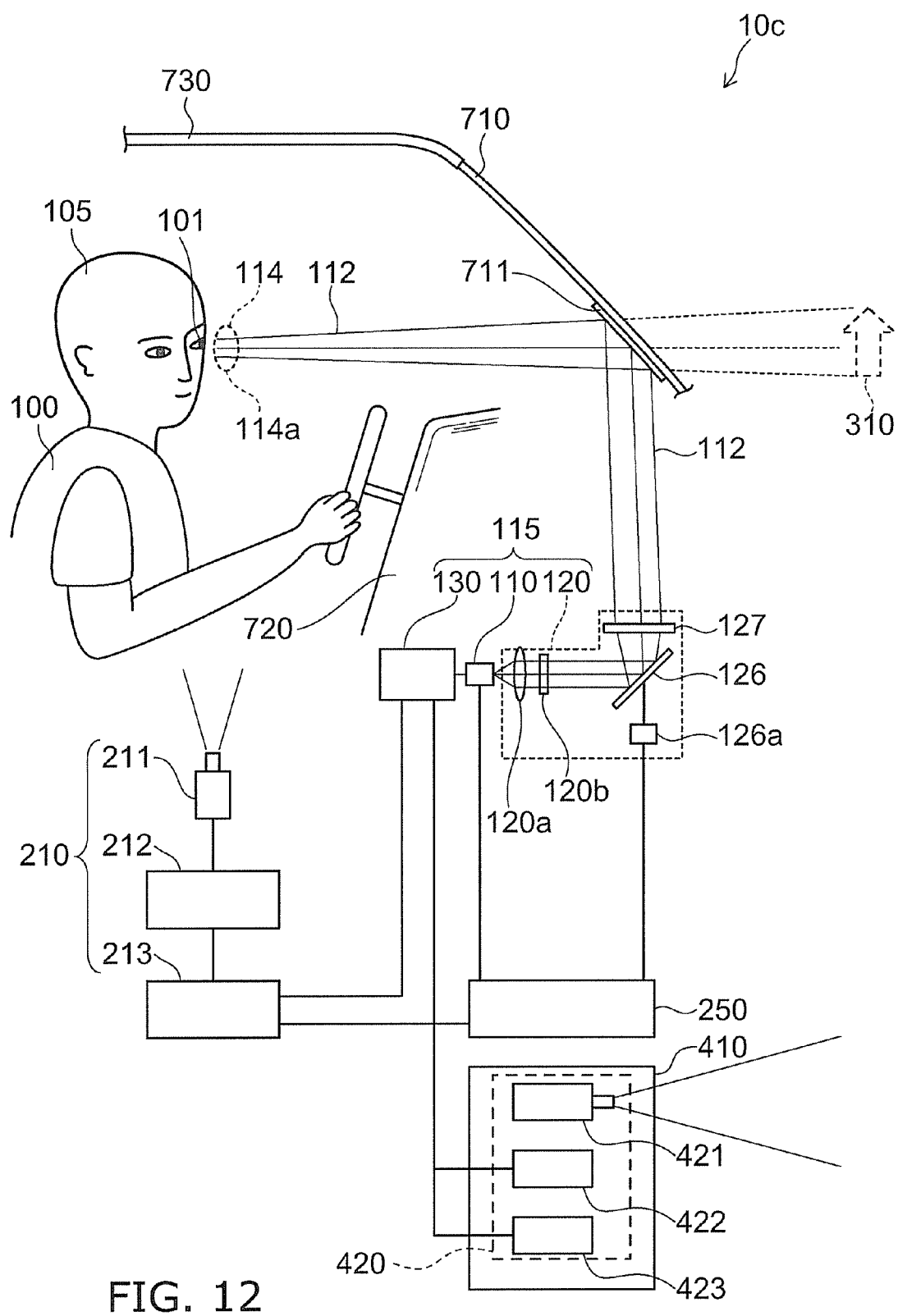
FIG. 12 is a schematic view illustrating the configuration of an display system according to a third example of the first embodiment.

FIG. 12 is a schematic view illustrating the configuration of an display system according to a third example of the embodiment.

As shown in FIG. 12, in the display system 10c according to the third example, the outside information-obtaining section 410 has an outside information-detecting section 420 configured to detect the outside information ahead of the moving object 730. In this specific example, the outside information-detecting section 420 has an outside image-taking section 421 (camera), an image-analyzing section 422 configured to analyze the image taken by the outside image-taking section 421, and an outside information-generating section 423 configured to extract various information in regard to shape of road or traffic intersection, obstacle, or the like from the image analyzed in the image-analyzing section 422 and generate the outside information. Thereby, as the outside information, data concerning the road circumstances of the outside (such as, shape of road or traffic intersection, or obstacle) detected by the outside information-detecting section 420 are obtained. Moreover, the outside information-detecting section 420 may be composed so as to read the signal from various guidance signal generators such as beacon provided in the road or the like in which the moving object 730 travels and thereby to generate the outside information.

As described above, in the display system 10c according to this example, by providing the outside information-detecting section 420 configured to detect the outside information ahead of the moving object 730, the outside information-obtaining section 410 can obtain the outside information ahead of the moving object 730 that is momentarily changing. Thereby, the momentarily changing outside information can be obtained, and the traveling direction of the moving object 730 can be calculated more accurately.

At least part of various embodiments based on the above outside information data-storing section 410a may be combined with at least part of various embodiments based on the above outside information-detecting section 420 and carried out. Thereby, more accurate outside information can be obtained.

FOURTH EXAMPLE

Figure 13:
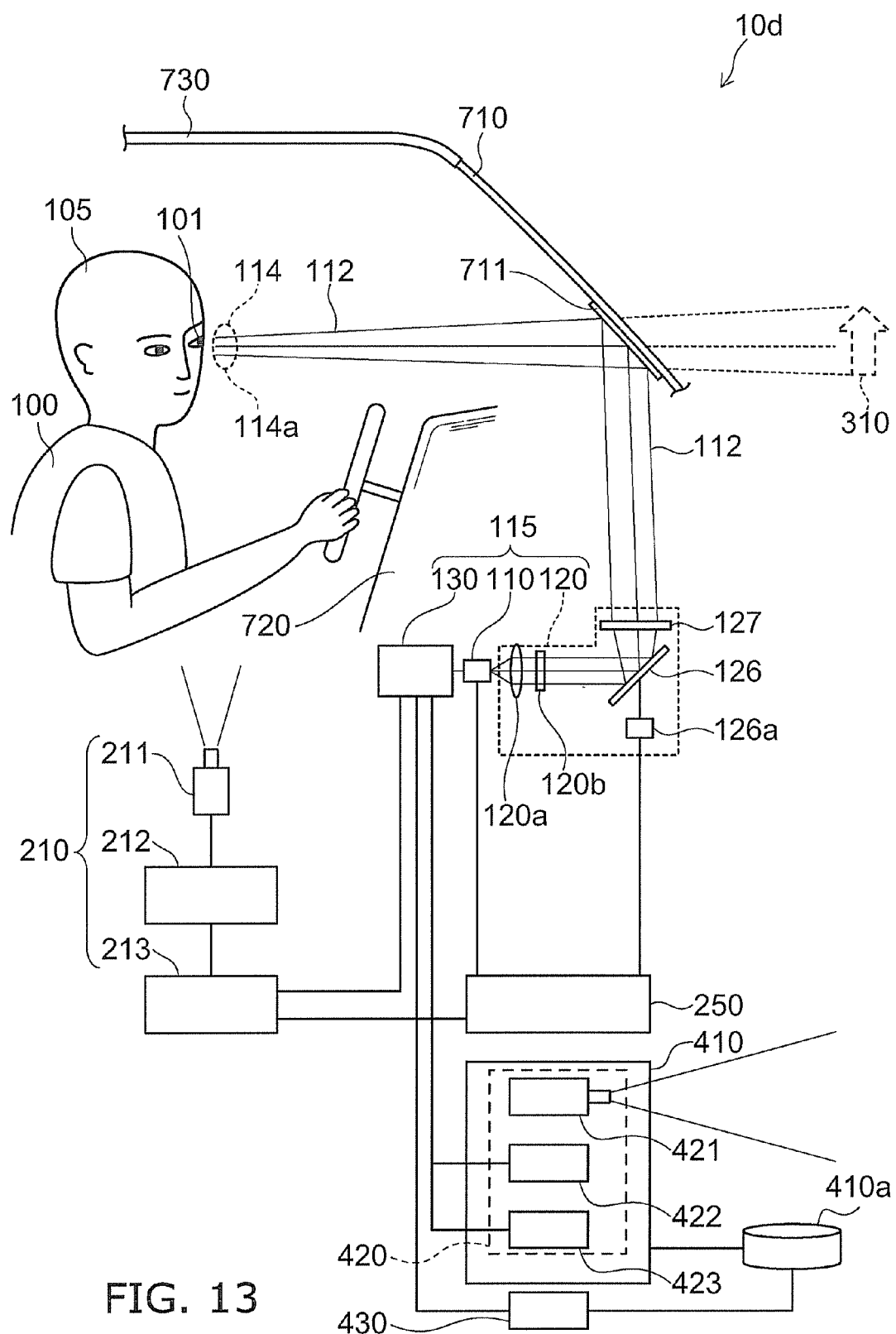
FIG. 13 is a schematic view illustrating the configuration of an display system according to a fourth example of the first embodiment.

FIG. 13 is a schematic view illustrating the configuration of an display system according to a fourth example of the embodiment.

As shown in FIG. 13, in the display system 10d according to the fourth example, a moving object position-detecting section 430 configured to detect the position of the moving object 730 is further provided. The moving object position-detecting section 430 can be illustratively based on GPS. And, the display object 180 is generated on the basis of the position of the moving object 730 detected by the moving object position-detecting section 430.

That is, on the basis of the outside information by the outside information-obtaining section 410 and the position of the moving object 730 detected by the moving object position-detecting section 430, the display object 180 is disposed. That is, the display object position P (Px, Py, Pz) is determined. Moreover, on the basis of the position of the moving object 730 detected by the moving object position-detecting section 430, the pathway in which the moving object is presumed to travel is obtained, and from the pathway, the form of the display of the display object 180 or the display object position P (Px, Py, Pz) is determined. In this case, as described above, the display object position (Px, Py, Pz) is also determined from the one-eye position E (Ex, Ey, Ez).

Thereby, the display object based on the accurate position of the moving object 730 can be displayed.

In this specific example, the outside information-obtaining section 410 has the outer information-detecting section 420 (having, for example, the outside image-taking section 421, the image-analyzing section 422, and the outside information-generating section 423) and the outside information data-storing section 410a, however the invention is not limited thereto. The outside information-detecting section 420 or the outside information data-storing section 410a may be provided.

That is, for example, the data-storing section corresponding to the outside information data-storing section 410 may be provided outside the moving object 730 provided with the display system 10, and for example, by applying various wireless communication techniques, the data of the data storing section corresponding to the outside information data-storing section 410a can be input to the outside information-obtaining section 410.

In this case, by utilizing the data of the position of the moving object 730 by GPS or a system configured to detect the traveling direction that is provided in the moving object 730 (this may be housed in the display system according to this embodiment or may be provided separately), appropriate data out of the data stored in the data-storing section corresponding to the outside information data-storing section 410a can be input to the display system 10.

FIFTH EXAMPLE

Figure 14:
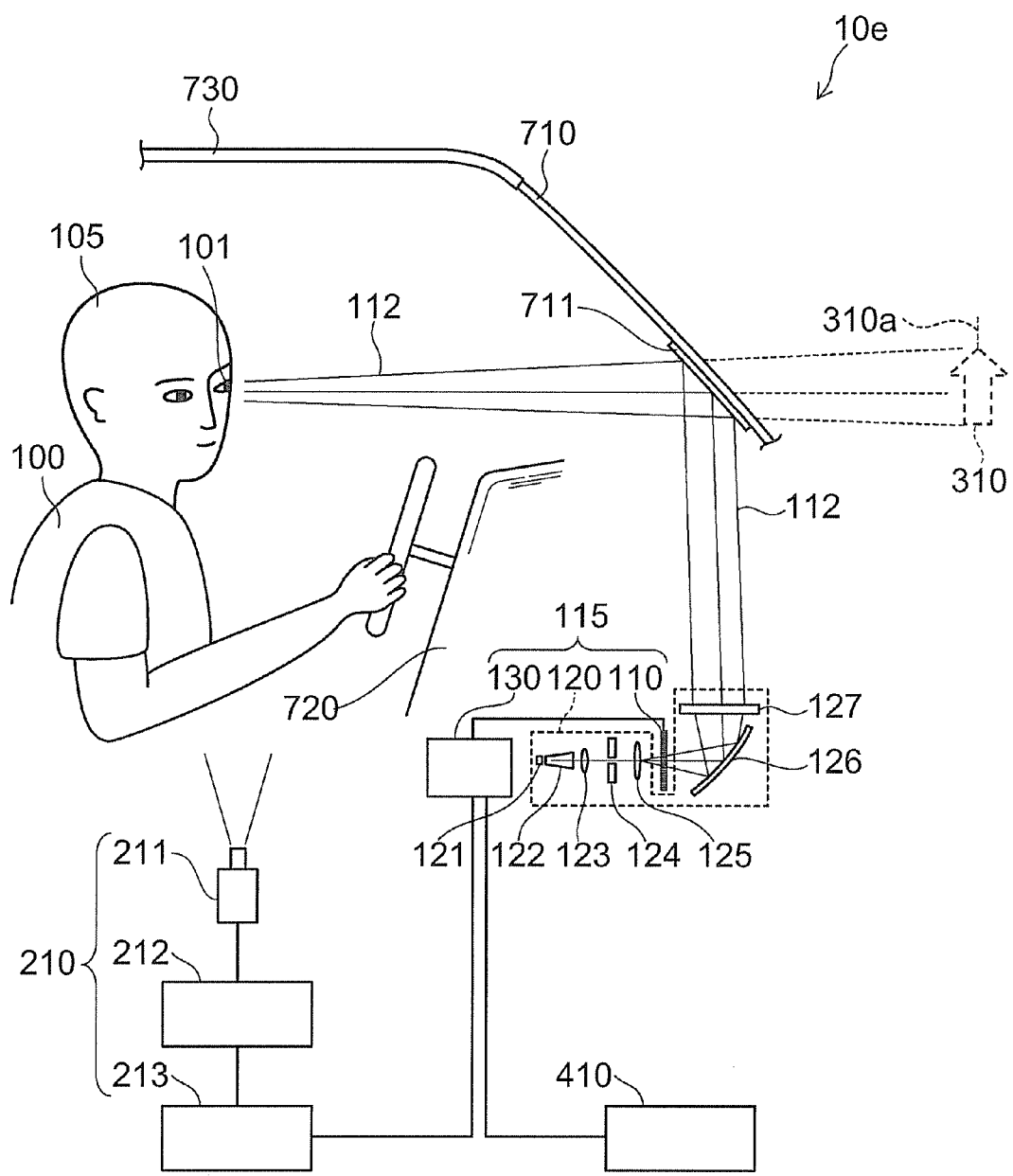
FIG. 14 is a schematic view illustrating the configuration of an display system according to a fifth example of the first embodiment.

FIG. 14 is a schematic view illustrating the configuration of an display system according to a fifth example of the embodiment.

As shown in FIG. 14, the display system 10e according to the fifth example has the different configuration of the image-projecting section 115 from that of the display system 10 illustrated in FIG. 1. Specifically, the configurations of the image-forming section 110 and the projection section 120 are different from those the display system 10. Moreover, this specific example is an example that is not provided with the control section 250. Other than this configuration, the display system 10e is the same as the display system 10, and hence, the description thereof will be omitted.

Also, in the display system 10e according to this example, the image-forming section 110 can be based on various optical switches such as LCD, DMD, and MEMS. And, the image-forming section 110 forms the image on the screen of the image-forming section 110 on the basis of the image signal including the image including the display object 180 supplied from the image data-generating section 130.

The image-forming section 110 can also be based on a laser projector or LED projector or the like, and in this case, the image is formed by a laser beam.

Hereinafter, the case where LCD is used as the image-forming section 110 will be described.

And, the projection section 120 projects the image formed in the image-forming section 110 to one eye 101 of the image viewer 100.

The projection section 120 can be illustratively based on various light sources, projection lens, mirror, and various optical elements controlling the divergence angle (diffusion angle).

In this specific example, the projection section 120 is illustratively based on a light source 121, a taper light guide 122, a first lens 123, a variable aperture 124, a second lens 125, a mobile mirror 126 having, for example, a concave shape, and an aspheric Fresnel lens 127.

For example, when the focus distance of the first lens 123 is f1 and the focus distance of the second lens 125 is f2, the variable aperture 124 is disposed at the position of the distance of f1 from the first lens 123 and the distance of f2 from the second lens 125.

And, the light flux outgoing from the second lens 125 is input to the image-forming section 110 and becomes the light flux 112 modulated by the image formed in the image-forming section 110.

The light flux 112 passes through the mirror 126 and the aspheric Fresnel lens 127, and is reflected by a reflecting body 711 provided on, for example, the windshield 710 of the moving object 730 on which the display system 10e is mounted, and is projected to one eye 101 of the image viewer 100. And, the image viewer 100 perceives a virtual image 310 formed in a position of a virtual image-formed position 310a, through the reflecting body 711. As described above, the display system 10 can be used as HUD.

For the light source 121, various light sources of LED, high-pressure mercury lamp, halogen lamp, laser, and so forth can be used. Moreover, the aspheric Fresnel lens 127 can be designed, for example, so that the shape (sectional shape or the like) of the light flux 112 can be controlled in accordance with the shape of the windshield 710.

Also, according to the display system 10e having such a configuration, the display object 180 can be disposed at an optional depth position. This can provide the display system which displays the display object 180 at an optional depth position and performs display that is easily viewable for the driver.

Also, in this case, the control section 250 configured to adjust at least any one of the projection range 114a and the projection position 114 of the light flux 112 by controlling the image-projecting section 115 on the basis of the position of one eye 101 of the image viewer 100 detected in the position-detecting section 210 may be provided. For example, the control section 250 controls the driving section 126a connected to the mirror 126, and controls the angle of the mirror 126, and thereby, controls the projection position 114. Moreover, the control section 250 can control the projection range 114a, for example, by controlling the variable aperture 124.

Moreover, in the display system 10e according to this example, the pathway-generating section 450, the outside image-taking section 421, the image-analyzing section 422, the outside information-generating section 423, the outside information data-storing section 410a, and the moving object position-detecting section 430 which have been described with regard to the first to fourth examples may be each singly provided or may be provided in combination.

SIXTH EXAMPLE

The display system 10f (not shown) according to a sixth example of the embodiment is provided with the pathway-generating section 450 described with reference to the display system 10a in the display system 10d according to the fourth example.

Figure 15:
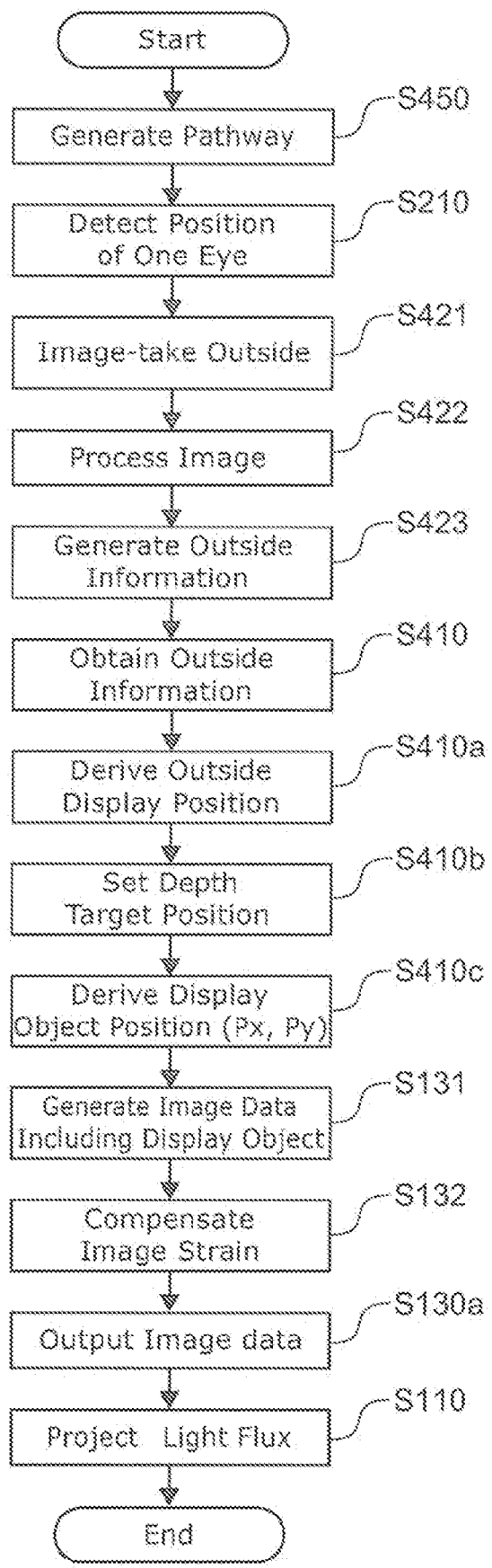
FIG. 15 is a flow chart illustrating the operation of an display system according to a sixth example of the first embodiment.

FIG. 15 is a flow chart illustrating the operation of the display system according to the sixth example.

That is, FIG. 15 illustrates the operation of the display system 10f in the case where the pathway-generating section 450 is provided in the display system 10d according to the fourth example. However, as described previously, the section having the same function as the pathway-generating section 450 may be provided outside the display system 10f or outside the moving object 730, and also in this case, the operation described below can be carried out.

As shown in FIG. 15, first, the pathway in which the moving object 730 is presumed to travel is generated (Step S450). For this, for example, map information stored in the outside information data-storing section 410a can be used. Moreover, the data concerning the destination input by the driver (image viewer 100) getting on the moving object 730 can be used. Moreover, the data concerning the current position of the moving object 730 detected by the moving object position-detecting section 430 can be used as the data concerning the position of the point of starting. The data concerning the point of starting may be input by the driver (image viewer 100) or the like. Moreover, as described previously, ideas of a plurality of pathways may be extracted, and the driver (image viewer 100) or the like may be promoted to select the ideas, and thereby, the pathway input by the driver (image viewer 100) or the like can be adopted.

And, as shown in FIG. 15, first, the position of one eye 101 of the image viewer 100 is detected (Step S210).

Next, by the outside image-taking section 421, for example, the outside ahead of the moving object 730 is image-taken (Step S421).

And, the image taken by the outside image-taking section 421 is analyzed by the image-analyzing section 422 (Step S422).

And, on the basis of the image analyzed by the image-analyzing section 422, the outside information-generating section 423 extracts various information concerning shape of road or traffic intersection, or obstacle and generates the outside information (Step S423).

And, the outside information generated in this outside information-generating section 423 is obtained by the outside information-obtaining section 410 (Step S410).

Next, on the basis of the preliminarily set pathway and the outside information, as the position in the outside information of the target, the outside display position T (Tx, Ty) is derived (Step S410a). For example, it is assumed that the position for the display object 180 such as an arrow is on the road at 50 m forward of the moving object 730 corresponding to, for example, the set pathway in the above description. In this case, the position of 50 m forward on the road is recognized by the outside image-taking section 421. And, the distance is measured and the outside display position T (Tx, Ty) is derived.

Then, the depth target position is set (Step S410b).

And, the display object position P (Px, Py) is derived from the above (Step S410c). That is, for example, the gravity center position coordinate of the display object 180, namely, display object position P (Px, Py) is derived from the position of one eye 101 of the image viewer 100 and the outside display position T (Tx, Ty).

Hereinafter, in the same manner as FIG. 8, on the basis of the data of the display object position P (Px, Py), the image data including the display object 180 is generated (Step S131). In this case, if the display object 180 is inclined or shaded according to the outside land shape, the display object 180 can be displayed more really to be in the set position.

Then, the generated image data is subjected to the image strain compensation (Step S132).

The image data is output to the image-forming section 110 (Step S130a).

And, the image-forming section 110, on the basis of the image data, projects the light flux 112 including the image having the display object 180 toward one eye 101 of the image viewer 100, and the image is displayed (Step S110).

In the above description, the order of Steps S450, S210, S421, S422, S423, S410, S410a, S410b, S410c, S131, S132, S130a, and S110 can be replaced as long as technically feasible, and the Steps can be carried out simultaneously.

In the display system according to this embodiment and the above various examples, as described previously, the depth position is replaced by two-dimensional coordinate and calculated. When the image viewer 100 looks ahead, in the case where the outside display position T (Tx, Ty) is overlapped with the forward direction, the vertical direction corresponds to the depth position. When the outside display position T (Tx, Ty) is in the position displaced from the forward direction, as well as the vertical direction, the lateral direction corresponds to the depth position. From this image coordinate, the depth position is provided.

Similarly, when the display object position P (Px, Py) is overlapped with the forward direction, the vertical direction corresponds to the depth position. When the display object position P (Px, Py) is at the position displaced from the forward direction, as well as the vertical direction, the lateral direction corresponds to the depth position. As described above, the vertical position (and lateral position) of the display screen displayed by the display system becomes the depth position information for the driver (image viewer 100), and thereby, from the position of the driver and the outside position and the position of the display screen, the depth disposition position of the display object 180 is determined.

Figure 16:
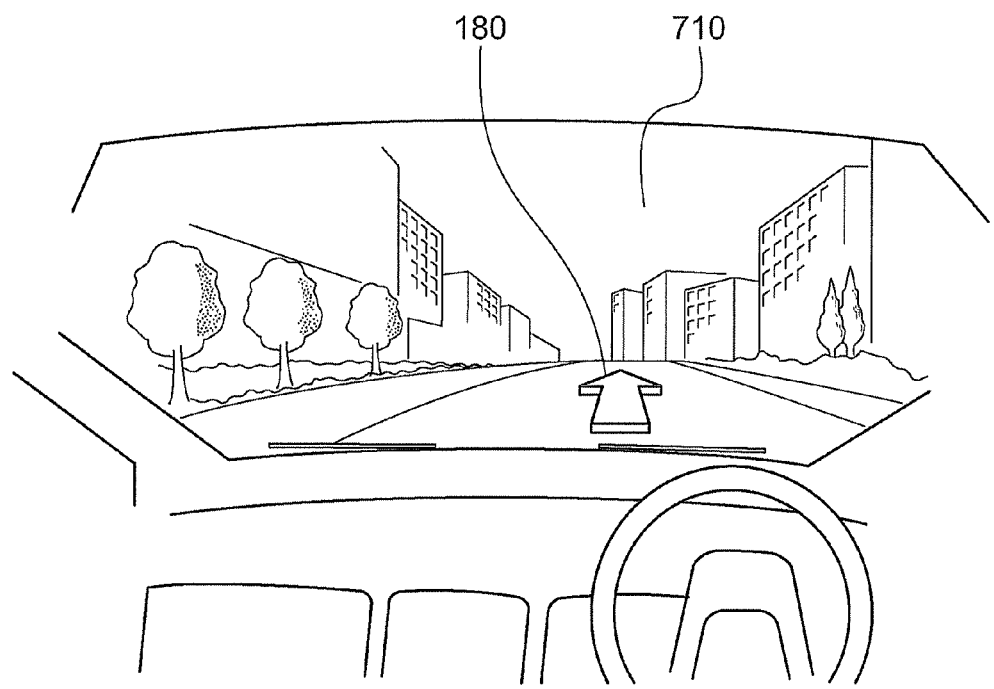
FIG. 16 is a schematic view illustrating the operation of the display system according to the first embodiment.

FIG. 16 is a schematic view illustrating the operation of the display system according to the embodiment.

That is, FIG. 16 illustrates the appearance that the image displayed by the display system according to this embodiment and the above examples and the outside are overlapped and viewed.

As shown in FIG. 16, by the display system according to this embodiment and the above examples, the image in which the display object 180 is disposed at an appropriate depth position can be displayed, and this image and the outside image through the windshield 710 can be viewed simultaneously.

Second Embodiment

Hereinafter, a display method according to a second embodiment of the invention will be described.

Figure 17:
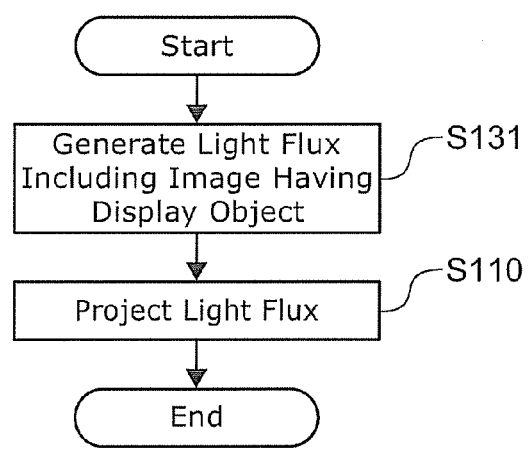
FIG. 17 is a flow chart illustrating a display method according to a second embodiment of the invention.

FIG. 17 is a flow chart illustrating the display method according to the second embodiment.

As shown in FIG. 17, in the display method according to the second embodiment, first, the position of the target in the outside information of the moving object 730 is obtained, and the light flux 112 including the image having the display object 180 generated from the obtained position is generated (Step S131).

And, the position of one eye 101 of the image viewer 100 getting on the moving object is detected and the light flux 112 is projected toward one eye 101 of the image viewer 100 on the basis of the detected position of one eye 101 (Step S110).

Thereby, the display object 180 is disposed at an optional depth position, and the display method for performing the display that is easily viewable for the driver can be provided.

Furthermore, the display object 180 is further generated on the basis of the detected position of one eye 101. Thereby, for the display object 180 disposed at an optional depth position, the depth position can be more accurately perceived.

In this case, as described with reference to FIG. 7, when the distance between the position of the target in the outside information and the moving object 730 is shorter than the preliminarily set distance, the depth target position at which the display object 180 is disposed can be made to accord with the depth position of the position of the target in the outside information.

For example, on the basis of the pathway in which the moving object 730 is presumed to travel, the depth target position at which the display object 180 is disposed is calculated, and when the distance between the depth target position and the moving object 730 is shorter than the preliminarily set distance, in the image, the depth position corresponding to the display object 180 to be displayed of the outside information is made to accord with the depth target position, and the display object 180 is disposed at the depth target position.

When the distance between the position of the target in the outside information and the moving object 730 is the preliminarily set distance or larger, the depth target position at which the display object 180 is disposed can be farther disposed than the depth position of the position of the target in the outside information as viewed from the image viewer 100.

For example, when the distance between the depth target position and the moving object 730 is the preliminarily set distance or larger, in the image, the depth target position is compensated to be at a farther position than the depth position of the outside information corresponding to the display object 180 to be displayed, and the display object 180 is disposed at the compensated depth target position.

Furthermore, when the distance between the position of the target in the outside information and the moving object 730 is shorter than the preliminarily set distance, the position at which the display object 180 is disposed in the image can be made to accord with the position corresponding to the position in the outside information of the target in the image.

For example, on the basis of the pathway in which the moving object 730 is presumed to travel, the depth target position at which the display object 180 is disposed is calculated, and when the distance between the depth target position and the moving object 730 is shorter than the preliminarily set distance, the display object 180 is disposed at the position corresponding to the depth target position in the image.

And, when the distance between the position of the target in the outside information and the moving object 730 is the preliminarily set distance or larger, the position at which the display object 180 is disposed in the image is disposed at a position farther than a position in the image corresponding to the position in the outside information of the target from the center in the image.

That is, when the distance between the depth target position and the moving object 730 is the preliminarily set distance or larger, the disposition position of the display object 180 is compensated to be a position farther than a position in the image corresponding to the depth target position from the center of the image, and the display object 180 is disposed.

The above preliminarily set distance includes any one of 45 m and 60 m.

Thereby, the display method can be provided, which is made to correspond to the characteristic of depth perception of a viewer and more accurately disposes the display object 180 at an optional depth position, and performs the display that is easily viewable for the driver.

As described above, the embodiments of the invention have been described with reference to specific examples. However, the invention is not limited to the specific examples. For example, the specific configurations of each of the components constituting the display systems and the display method are encompassed within the scope of the invention, as long as the invention can be implemented by appropriate selection from the known range by those skilled in the art and the same effect can be achieved.

Moreover, components in two or more of the respective specific examples can be combined as long as technically feasible, and such components are also encompassed within the scope of the invention as long as falling within the spirit of the invention.

In addition, all of the display systems and the display method described above as the embodiments of the invention can be suitably modified and practiced by those skilled in the art, and such modifications are also encompassed within the scope of the invention as long as falling within the spirit of the invention.

In addition, various other variations and modifications can be conceived by those skilled in the art within the spirit of the invention, and it is understood that such variations and modifications are also encompassed within the scope of the invention.

The invention claimed is:

1. A display system for vehicle, comprising:
an outside information-obtaining section configured to obtain outside information of a moving object;
a position-detecting section configured to detect a position of one eye of an image viewer getting on the moving object; and
an image-projecting section configured to obtain a position of a target in the outside information obtained by the outside information-obtaining section, to generate a display object on the basis of the position of the target, and to project a light flux including an image having the generated display object toward the one eye of the image viewer on the basis of the position of the one eye.

2. The system according to claim 1, wherein the display object is further generated on the basis of the position of the one eye.

3. The system according to claim 1, wherein the outside information-obtaining section obtains the outside information from data concerning the outside information that is preliminarily stored.

4. The system according to claim 1, wherein the outside information-obtaining section has an outside information-detecting section configured to detect the outside information around the moving object, and the outside information-obtaining section obtains the outside information detected by the outside information-detecting section.

5. The system according to claim 1, wherein the display object is generated on the basis of a distance between the position of the target and the moving object.

6. The system according to claim 1, wherein the target is determined on the basis of the pathway in which the moving object is presumed to travel.

7. The system according to claim 1, further comprising a pathway-generating section configured to generate a pathway in which the moving object is presumed to travel,
the target being determined on the basis of the pathway generated in the pathway-generating section.

8. The system according to claim 1, further comprising a moving object position-detecting section configured to detect a position of the moving object,
the target being determined on the basis of the position of the moving object detected by the moving object position-detecting section.

9. The system according to claim 1, wherein the image-projecting section generates the display object in a depth target position at which the display object is disposed on the basis of a depth position of the position of the target in the outside information.

10. The system according to claim 1, wherein the image-projecting section generates the display object at a depth target position that is farther than a depth position of the position of the target in the outside information as viewed from the image viewer.

11. The system according to claim 1, wherein the position at which the display object is disposed in the image accords with a position to which a position in the outside information of the target corresponds in the image.

12. The system according to claim 1, wherein the position at which the display object is disposed in the image is disposed at a position farther than a position in the image corresponding to a position in the outside information of the target from a center in the image.

13. The system according to claim 1, wherein
when a distance between the position of the target in the outside information and the moving object is shorter than a preliminarily set distance, a depth target position at which the display object is disposed accords with a depth position of the position of the target in the outside information, and
when the distance between the position of the target in the outside information and the moving object is the preliminarily set distance or larger, the depth target position at which the display object is disposed is disposed farther than the depth position of the position of the target in the outside information as viewed from the image viewer.

14. The system according to claim 13, wherein the preliminarily set distance includes any one of 45 meters and 60 meters.

15. The system according to claim 1, wherein
when a distance between the position of the target in the outside information and the moving object is shorter than a preliminarily set distance, a position at which the display object is disposed in the image accords with a position to which a position in the outside information of the target corresponds in the image, and
when the distance between the position of the target in the outside information and the moving object is the preliminarily set distance or larger, the position at which the display object is disposed in the image is disposed at a position farther than a position in the image corresponding to a position in the outside information of the target from a center in the image.

16. The system according to claim 15, wherein the preliminarily set distance includes any one of 45 meters and 60 meters.

17. The system according to claim 1, wherein at least any one of gradient and size of the display object can be varied on the basis of the position of the target.

18. The system according to claim 1, wherein the image-projecting section includes:
an image data-generating section configured to generate the image data including the display object;
an image-forming section configured to form an image including the display object on the basis of the image data generated in the image data-generating section;
a projection section configured to project the light flux including the image formed in the image-forming section to the one eye of the image viewer; and
a control section configured to adjust at least one of a projection range and a projection position of the light flux by controlling the image-projecting section.

19. The system according to claim 1, wherein the image projecting-section projects the light flux toward the one eye of the image viewer by reflecting the light flux by a transparent plate compartmenting a space into a space housing the image viewer of the moving object and a space outside the moving object.

20. A display method comprising:
obtaining a position of a target in outside information of a moving object;
generating a display object on the basis of the obtained position of the target;
generating a light flux including an image having the generated display object;
detecting a position of one eye of an image viewer getting on the moving object; and
projecting the light flux toward the one eye of the image viewer on the basis of the position of the one eye.

* * * * *